United States Patent [19]

Hanser

[11] Patent Number: 4,597,584
[45] Date of Patent: Jul. 1, 1986

[54] AUTOMATIC LEVELLING SYSTEM

[75] Inventor: Paul E. Hanser, Wilton, Iowa

[73] Assignee: HWH Corporation, Moscow, Iowa

[21] Appl. No.: 605,802

[22] Filed: May 1, 1984

[51] Int. Cl.$^4$ ............................................. B60S 9/00
[52] U.S. Cl. .................................. 280/6 R; 180/41;
251/282; 251/903; 254/423; 261/DIG. 38;
280/DIG. 1
[58] Field of Search ......... 280/6 R, 6 H, 6.1, DIG. 1;
180/41; 251/281, 282, DIG. 4; 261/DIG. 38;
254/423, 45, 425, 424, 418

[56] References Cited

U.S. PATENT DOCUMENTS

| | | | |
|---|---|---|---|
| 3,404,899 | 10/1968 | Vogel | 280/6 R |
| 3,669,409 | 6/1972 | Eranosian | 254/423 |
| 3,817,493 | 6/1974 | Hanser | 254/423 |
| 3,885,813 | 5/1975 | Kern | 254/45 |
| 4,061,309 | 12/1977 | Hanser | 254/423 |
| 4,067,543 | 1/1978 | Orth et al. | 254/425 |
| 4,084,830 | 4/1978 | Daniel, Jr. et al. | 280/707 |
| 4,165,861 | 8/1979 | Hanser | 254/423 |

FOREIGN PATENT DOCUMENTS 222381  8/1958  Australia ..................... 251/DIG. 4

Primary Examiner—John J. Love
Assistant Examiner—Kenneth R. Rice
Attorney, Agent, or Firm—Ellsworth R. Roston; Charles H. Schwartz

[57] ABSTRACT

A system for automatically levelling a vehicle, such as a recreational vehicle, relative to gravity includes a plurality of extensible jacks, preferably hydraulic, disposed at strategic positions on the bottom of the vehicle. A plurality of switches sense the downward tilting of the vehicle relative to gravity at the strategic positions and produce signals to operate the jacks in accordance with such tilting. The jacks are extended in a particular sequence depending upon the particular directions in which the vehicle is tilted relative to gravity. The jacks become extended only when the hydraulic pressure in a hydraulic circuit exceeds a particular value. Since the rear of the vehicle weighs considerably more than the front, the switches are constructed and are connected in a circuit to resolve any ambiguities in favor of initially operating the jacks at the rear of the vehicle. A delay is preferably provided between the operation of each jack and the operation of the next jack in the sequence so that transients in the levelling of the vehicle from the operation of each jack can be eliminated before the next jack is operated. When the vehicle has been levelled, jacks still not engaging the ground are extended until they engage the ground with a reduced force. When the hydraulic forces in the jacks are less than a particular value while the vehicle is travelling, the hydraulic fluid in the jacks is slowly bled to a reservoir so that hydraulic forces cannot accumulate in the jacks to operate the jacks.

63 Claims, 14 Drawing Figures

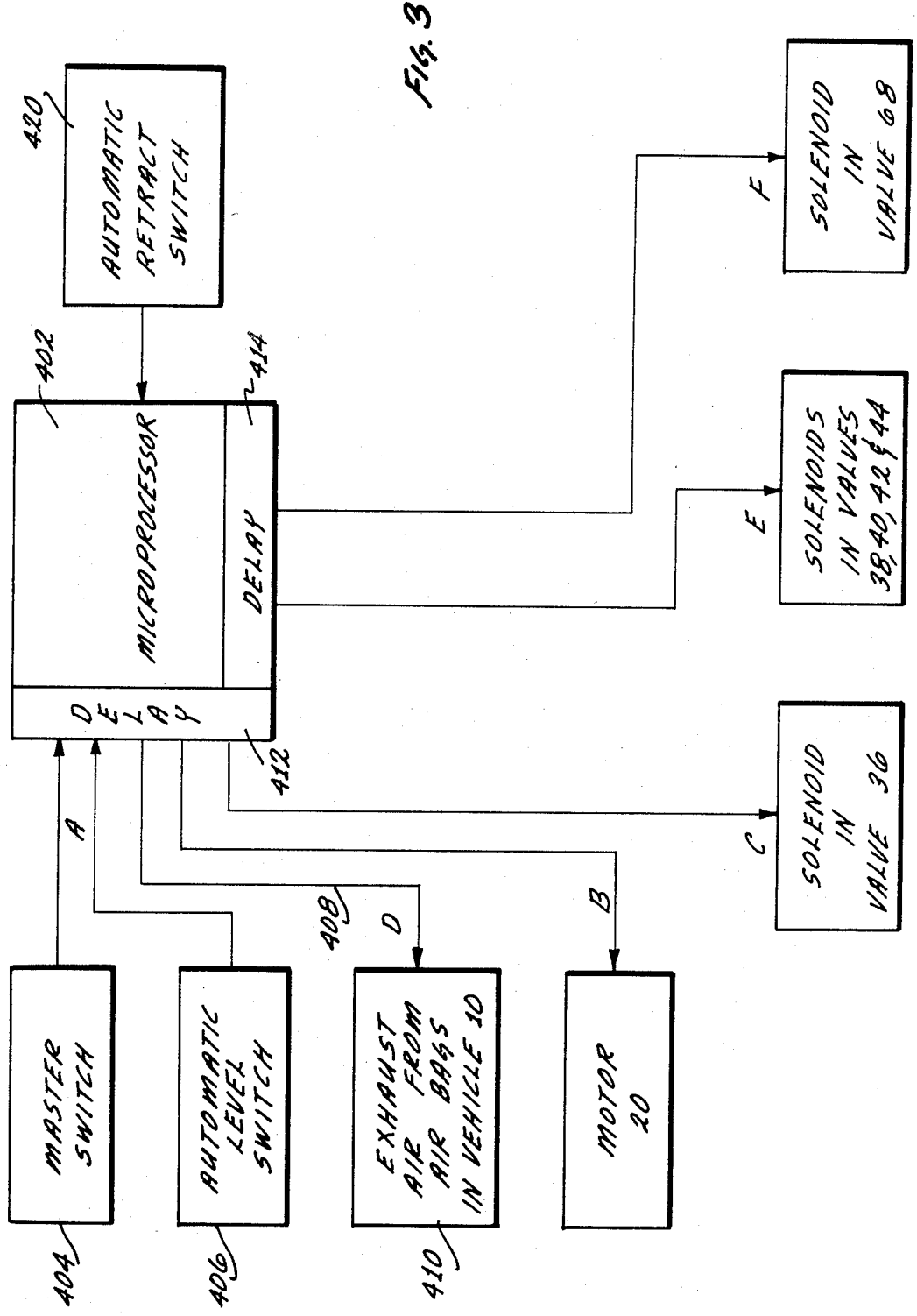

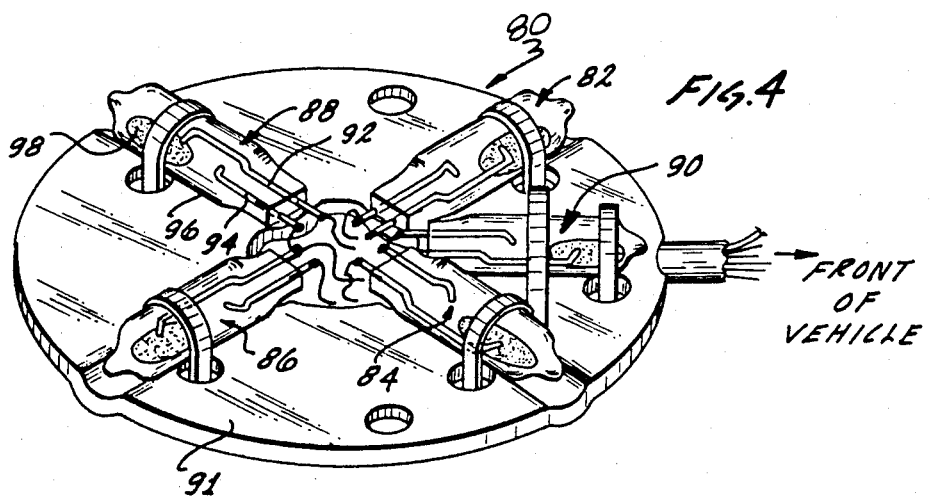
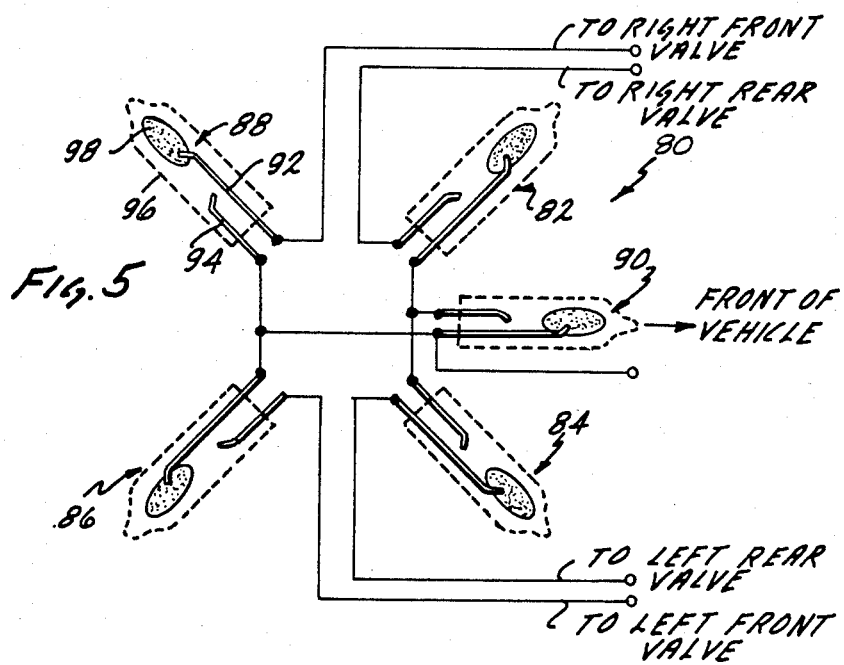
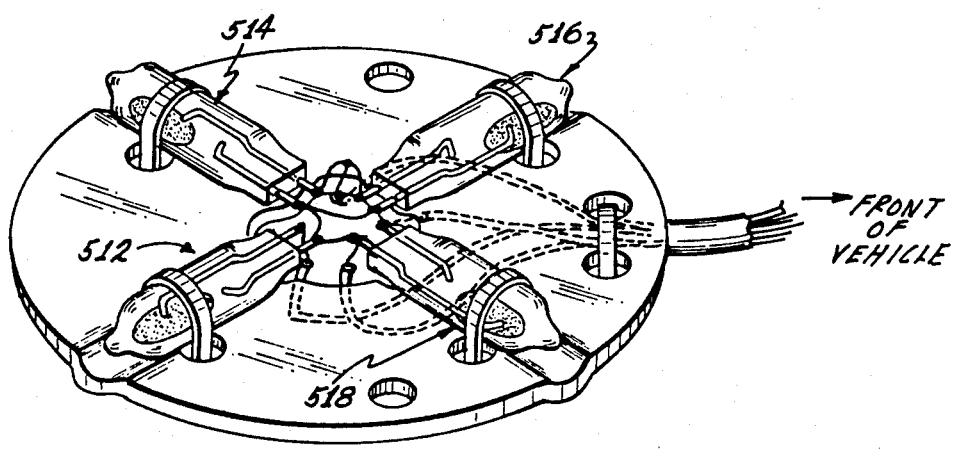

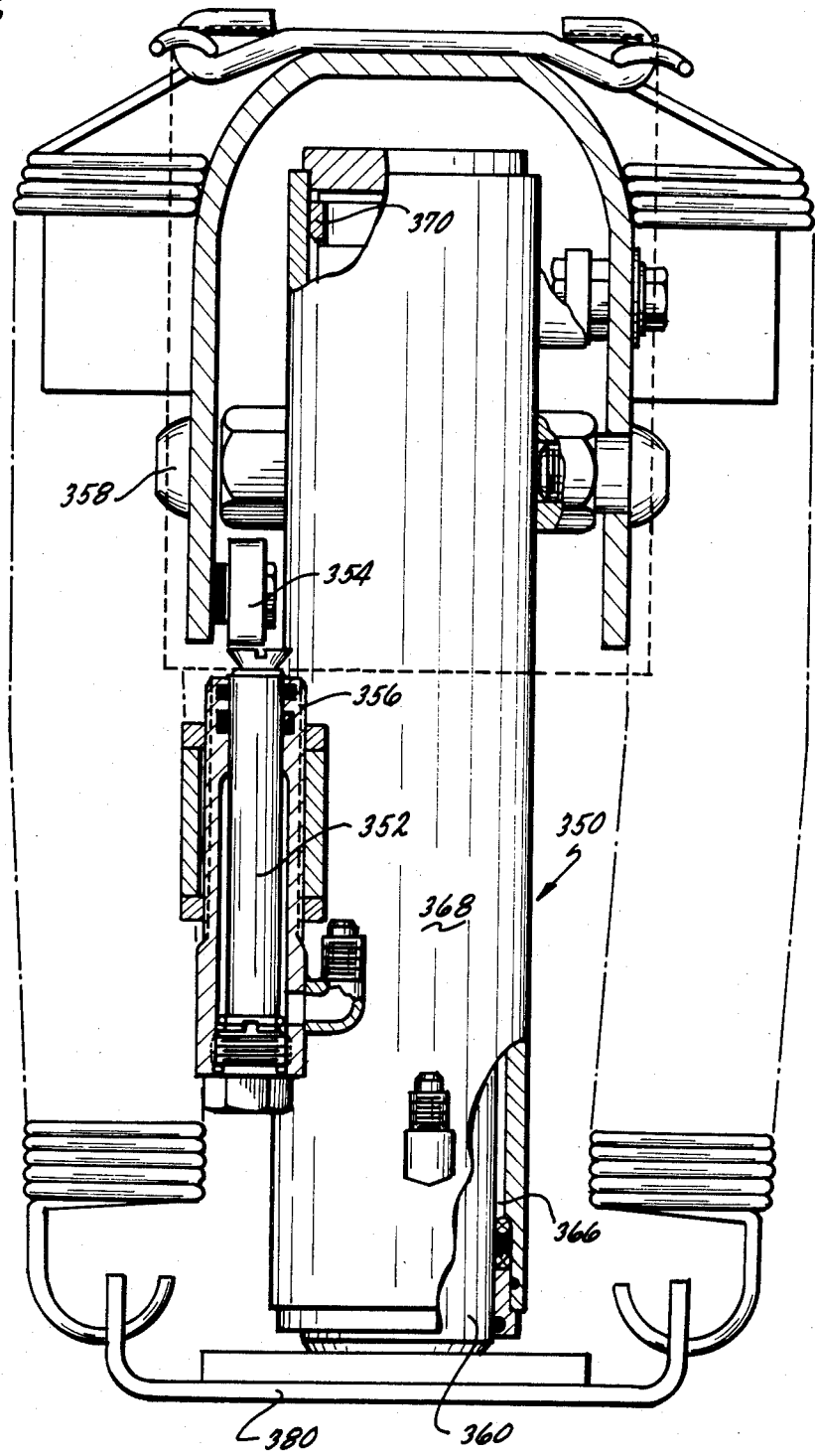

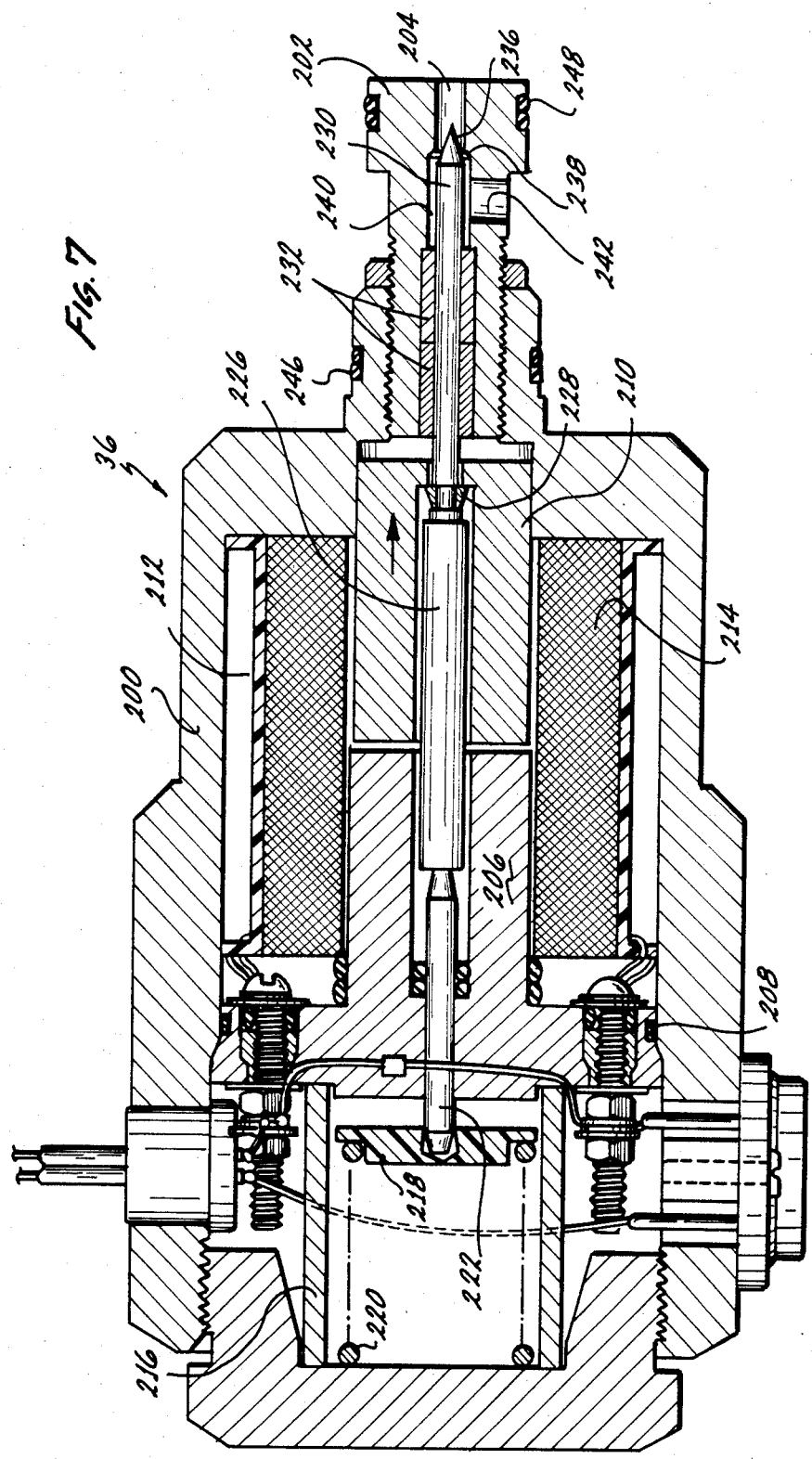

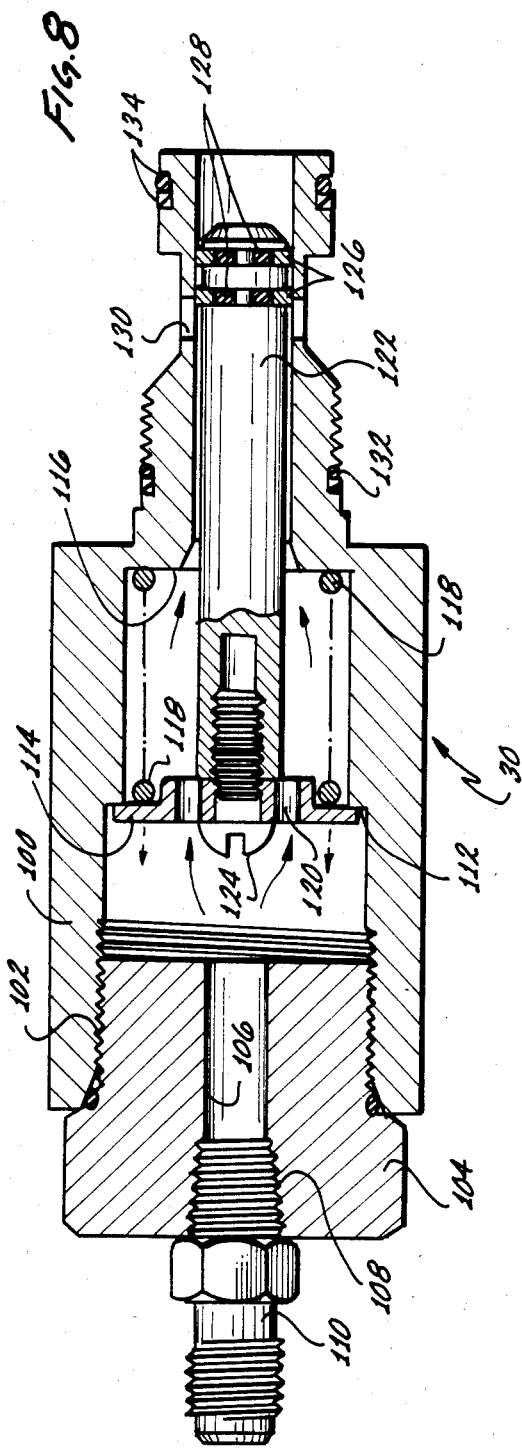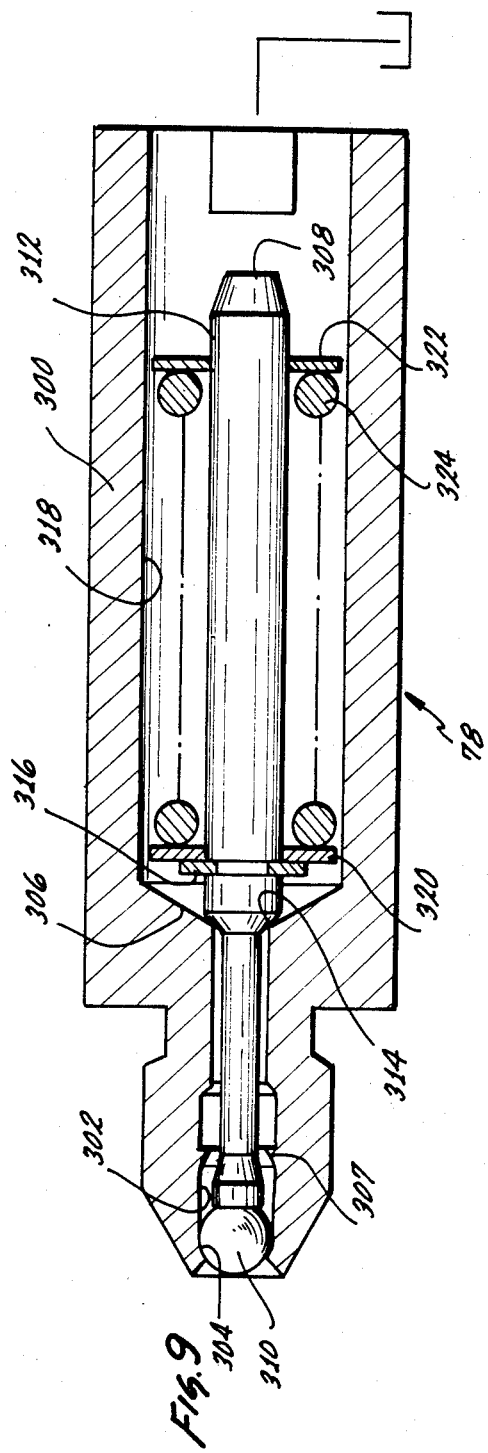

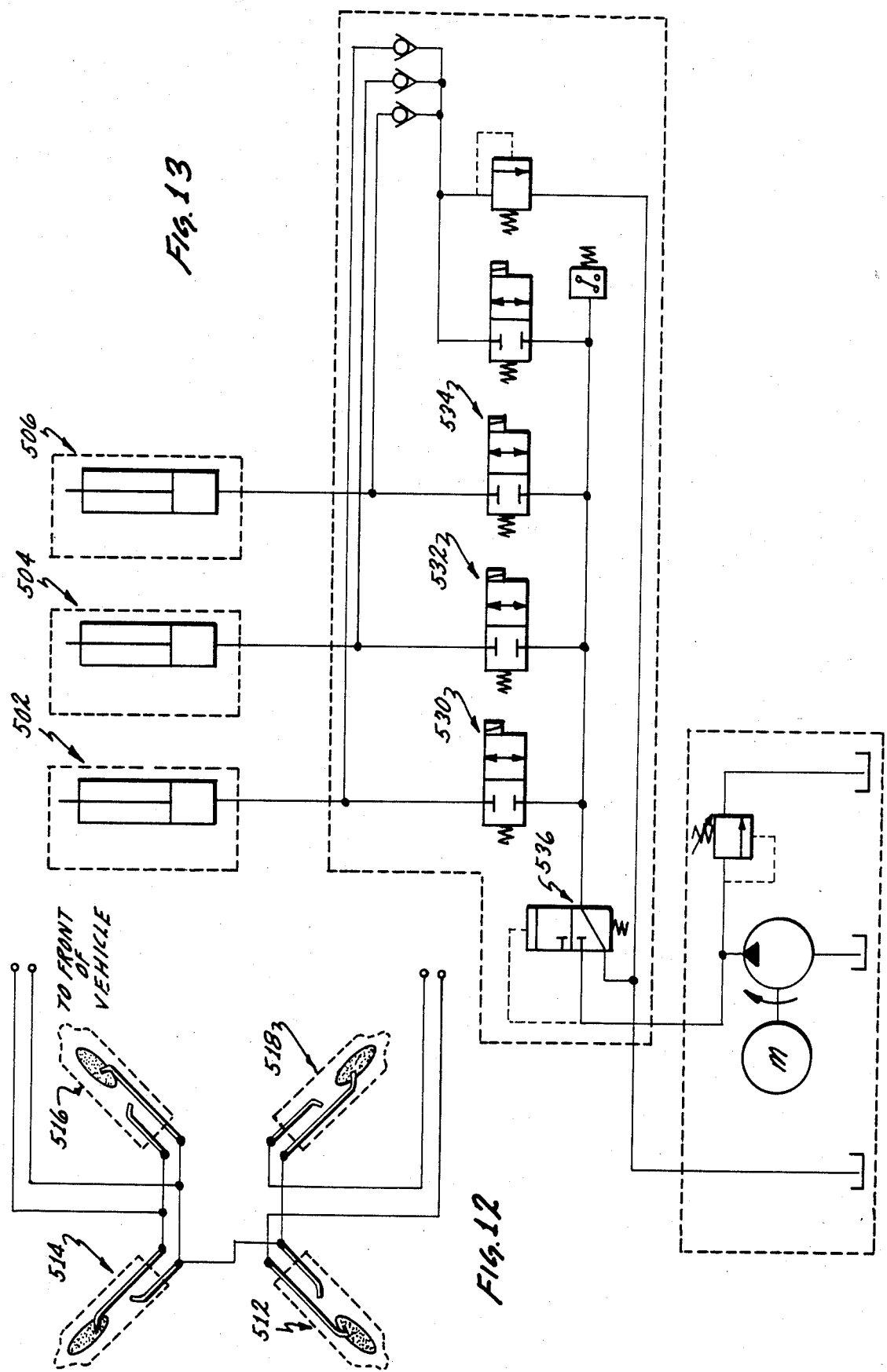

AUTOMATIC LEVELLING SYSTEM

This invention relates to systems for levelling vehicles, such as recreational vehicles, relative to gravity and more particularly to systems for automatically levelling such vehicles. The invention is particularly adapted to be used in vehicles which employ hydraulic jacks to level the vehicles relative to gravity.

Recreational vehicles are now in widespread use to provide families and individuals with vacation opportunities at relatively low cost. The recreational vehicles allow families and individuals to visit out-of-the-way locations of great scenic beauty and to enjoy the scenic beauty of these locations at relatively low cost. The vehicles also provide such families and individuals with the opportunity to hunt, fish, hike and engage in a number of outdoor sports while being assured of adequate accommodations and even of home cooking.

In many locations, the vehicles have to be parked at sites which are not level relative to gravity. This results from the fact that the available camp sites are often located in rugged terrain. However, in order to obtain optimal benefits from such sites, the recreational vehicles should preferably be level relative to gravity. For example, when the vehicle is level relative to gravity, dishes on tables are stable and people sleeping in beds can adopt and maintain comfortable positions.

Since recreational vehicles are often parked at decidedly non-level sites, jacks have been provided to adjust the disposition of the vehicle so as to make the vehicle level relative to gravity. These jacks may be either hydraulically or electrically operated. The jacks are generally disposed at the corners of the recreational vehicle and are attached to the vehicle at the underside of the vehicle. The jacks are individually operated to adjust the level of the vehicle relative to gravity. As will be appreciated, the individual operation of the jacks is time-consuming and not always precise. This can be especially disturbing to a family which arrives, tired and hungry, at a campsite in the evening and which then has to level the vehicle relative to gravity before the evening meal can be prepared and served and before the family can start to relax for the evening.

Since the recreational vehicle industry is relatively large, a considerable effort has been made, and substantial sums of money have been expended, to overcome the problems discussed in the previous paragraph. Some progress has actually been made. For example, the jacks in use have been improved through the years so that their performance is more reliable than the performance of the jacks manufactured and sold a few years ago. In spite of such progress, however, major problems still remain. The jacks still have to be individually operated, with no assurance that levelling of the vehicle relative to gravity can be accomplished in any reasonable period of time.

This invention provides a system for automatically levelling a vehicle relative to gravity. The system includes a plurality of extensible jacks, preferably hydraulic, disposed at strategic positions at the bottom of the vehicle. A plurality of switches sense the downward tilting of the vehicle relative to gravity at the strategic positions and produce signals to operate the jacks in accordance with such tilting. The jacks are extended in a particular sequence depending upon the particular directions in which the vehicle is tilted relative to gravity.

The jacks become extended only when the hydraulic pressure in a hydraulic circuit exceeds a particular value. The jacks tilted the greatest relative to gravity are initially extended. Since the rear of the vehicle weighs considerably more than the front, the switches are constructed and are connected in a circuit to resolve any ambiguities in favor of initially operating the jacks at the rear of the vehicle. A delay is preferably provided between the operation of each jack and the operation of the next jack in the sequence so that transients in the movement of the vehicle from the operation of each jack can be eliminated before the next jack is operated.

When the vehicle has been levelled relative to gravity, any jacks still not engaging the ground are extended until they engage the ground with a reduced force. When the hydraulic forces in the jacks are less than a particular value and the vehicle is travelling between destinations, the hydraulic fluid in the jacks is slowly bled to a reservoir so that hydraulic forces cannot accumulate in the jacks to operate the jacks.

In the drawings:

FIG. 1 is a schematic perspective view of the underside of a recreational vehicle and of jacks disposed at strategic terminals at the underside of the vehicle to level the vehicle;

FIG. 2 schematically shows a hydraulic system for automatically levelling a recreational vehicle;

FIG. 3 is a schematic block diagram of a microprocessor system for controlling the operation of the hydraulic system shown in FIG. 2;

FIG. 4 is a schematic perspective view of a switching assembly for controlling the operation of the hydraulic system of FIG. 2 and the microprocessor system of FIG. 3;

FIG. 5 is a circuit diagram showing electrical connections between particular ones of the switches shown in FIG. 4;

FIG. 6 is a sectional view of one of the hydraulic jacks which is included in the recreational vehicle of FIG. 1 and the hydraulic system of FIG. 2;

FIG. 7 is a sectional view of a hydraulic valve assembly which is operative by the hydraulic system of FIG. 2 and the microprocessor system of FIG. 3 to obtain an extension of the jack shown in FIG. 6;

FIG. 8 is a sectional view of a hydraulic pressure switch for obtaining a controlled introduction of hydraulic fluid to the hydraulic valve assembly of FIG. 7 and the jack of FIG. 6 when the pressure of the hydraulic fluid in the hydraulic system of FIG. 2 exceeds a particular value;

FIG. 9 is a sectional view of a hydraulic valve assembly for bleeding hydraulic fluid slowly from the jack of FIG. 6, for fluid pressures above a particular value, to prevent the jack from being extended at undesirable times such as when the vehicle is travelling between destinations;

FIG. 11 is a schematic perspective view of a switching assembly for use with the vehicle of FIG. 10;

FIG. 12 is a circuit diagram showing electrical connections between the switches in the switching assembly of FIG. 11;

Figure 10:
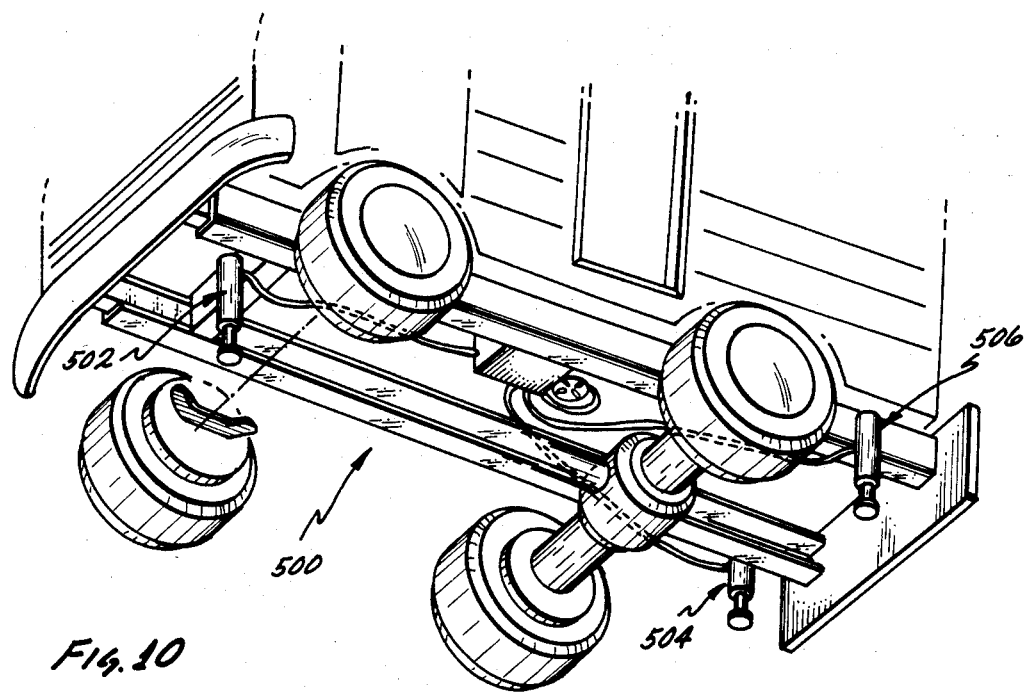
FIG. 10 is a schematic perspective view of another recreational vehicle in which only three jacks are used to level the vehicle.
Figure 14:
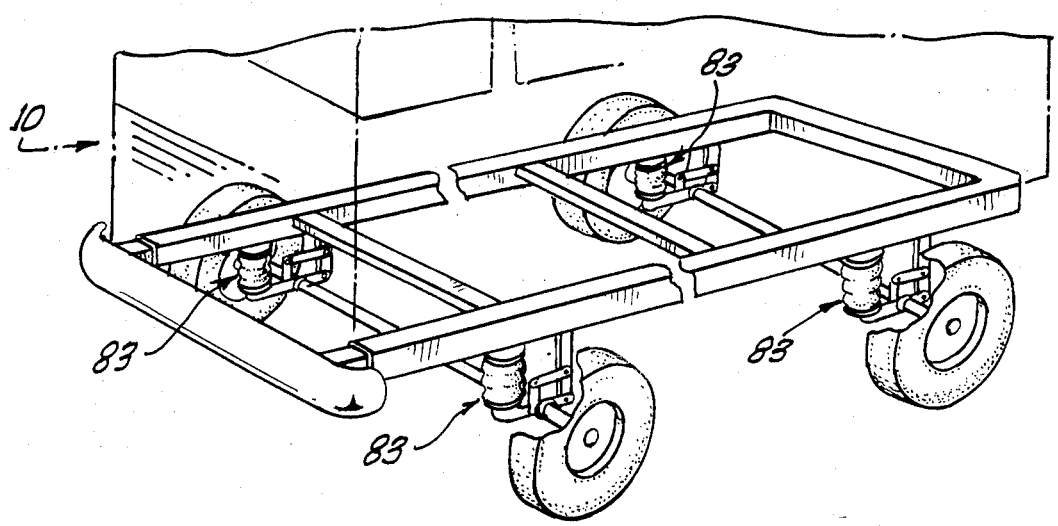

FIG. 13 schematically shows a hydraulic system for automatically levelling the recreational vehicle shown in FIG. 10; and FIG. 14 is a schematic perspective view illustrating the disposition of air bags in the recreational vehicle.

Figure 1:
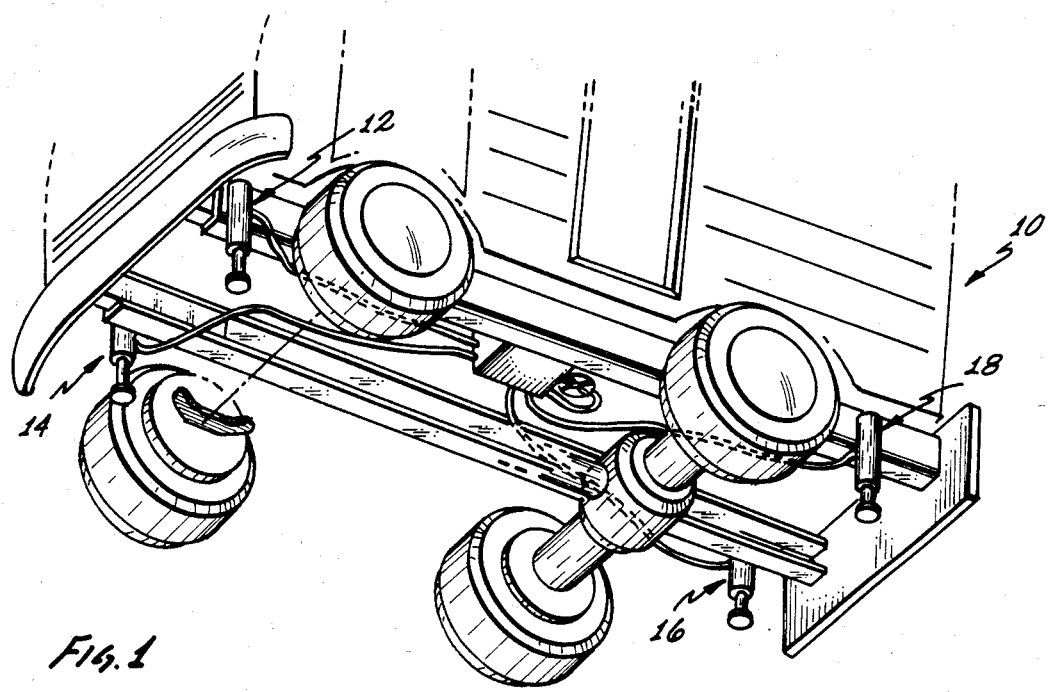

In one embodiment of the invention, a system is provided for automatically levelling, relative to gravity, a vehicle generally indicated at 10 (FIG. 1). The vehicle may be a recreational vehicle but it may also be any other type of vehicle such as a trailer. Accordingly, as used in the specification and claims, the term "vehicle" is intended to mean any type of carrier for transporting animate and inanimate objects.

The levelling of the vehicle 10 relative to gravity is provided by extending a plurality of jacks such as jacks generally indicated at 12, 14, 16 and 18. The jacks are preferably attached to the underside of the vehicle 10 at positions near the corners of the vehicle. The jacks 12, 14, 16 and 18 may be constructed in a conventional manner such as disclosed and claimed in U.S. Pat. No. 3,817,493 issued to me on Jan. 18, 1984 for a "Hydraulic Jack for Trailers", U.S. Pat. No. 4,165,861 issued to me on Aug. 28, 1979, for a "Vehicle Levelling System" or U.S. Pat. No. 4,061,309 issued to me on Dec. 6, 1977 for a "Vehicle Levelling System and Device Therefor".

Each of the jacks 12, 14, 16, and 18 receives hydraulic fluid initially to become pivoted to a vertical position from a horizontal position when the jack is disposed against the underside of the vehicle 10 in substantially flush relationship with the underside of the vehicle. The jacks are then extended downwardly upon a further introduction of hydraulic fluid to the jacks. However, as will be appreciated, the jacks may also be constructed to become extended or retracted only in the vertical direction without first becoming pivoted from the horizontal position to the vertical position.

Figure 2:
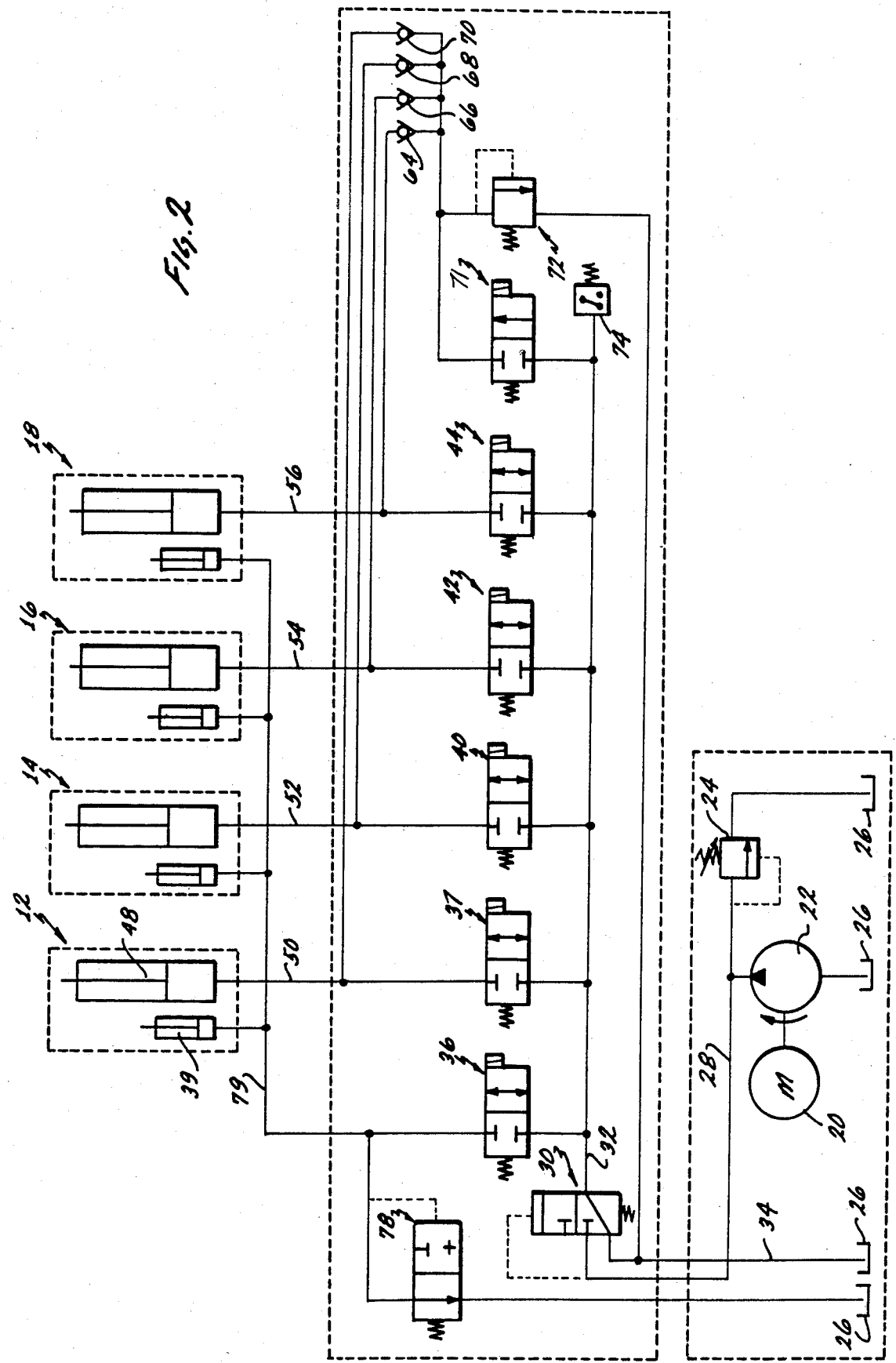

A hydraulic circuit for one embodiment of the invention is shown in FIG. 2. The hydraulic circuit shown in FIG. 2 includes a motor 20 which drives a pump 22. A hydraulic line extends from the pump 22 to a relief valve 24 which is set to operate at a particular pressure such as approximately three thousand pounds per square inch (3,000 psi). The relief valve 24 may be constructed in a conventional manner. The relief valve 24 operates to introduce hydraulic fluid to a reservoir 26 so as to provide a direct by-pass from the pump 22 to the reservoir 26 when excessive pressure occurs in the line as a result of a malfunction.

A hydraulic line 28 extends from the pump 22 to a hydraulic pressure switch generally indicated at 30. The switch 30 is shown in detail in FIG. 8. The valve 30 operates to pass the hydraulic fluid from the pump 22 to a hydraulic line 32 when the fluid introduced to the valve 30 has at least a particular pressure such as approximately six hundred pounds per square inch (600 psi). When the hydraulic pressure introduced to the pressure switch 30 is less than six hundred pounds per square inch (600 psi), the hydraulic fluid from the line 32 passes to the reservoir 24 through a line 34.

The hydraulic fluid in the line 32 is introduced to a valve, generally indicated at 36, which is shown in detail in FIG. 7. The valve 36 is operated electrically by an electrical switching arrangement generally indicated at 38 and shown in FIGS. 4 and 5. The valve 36 operates to pivot the jacks 12, 14, 16 and 18 from the horizontal disposition to the vertical disposition whenever a master switch is closed to obtain the operation of the automatic levelling system and when the automatic levelling cycle is started. The output from the valve 36 is connected to members 39 in the jacks 12, 14, 16 and 18 for pivoting the extendible arms of the jacks from their horizontal positions to their vertical positions.

Valves generally indicated at 37, 40, 42 and 44 are also included and are respectively connected to the jacks 12, 14, 16 and 18 through hydraulic lines 50, 52, 54 and 56. The valves 37, 40, 42 and 44 are individually activated by the electrical switching arrangement 38 of FIGS. 4 and 5 in accordance with the tilting of the recreational vehicle 10 from a horizontal level. When the valves 37, 40, 42 and 44 become activated, hydraulic fluid passes to the associated jacks 12, 14, 16 and 18 to activate the jacks and to produce an extension of arms 48 in the jacks. The valves 37, 40, 42 and 44 may be constructed in a manner similar to the construction of the valve 36.

The lines 50, 52, 54 and 56 are respectively connected through check valves 64, 66, 71 and 70 to a valve 68. The valve 71 may be constructed in a manner similar to that of the valve 36. Like the valves 37, 40, 42 and 44, the valve 71 is operative to obtain an extension of the jacks 12, 14, 16 and 18. However, the valve 71 is operative after the vehicle has been levelled. At this time, fluid flows through the valve 71 and the check valves 60, 62, 64 and 66 to extend to the ground any jacks 10, 12, 14 and 16 still displaced from the ground. The jacks 10, 12, 14 and 16 are extended until they engage the ground with a relatively low force such as approximately two hundred pounds per square inch (200 psi).

A valve generally indicated at 72 is connected between the reservoir 26 and the valve 68. The valve 72 constitutes a relief valve to pass the fluid from the valve 71 to the reservoir 26 when the pressure of the fluid from the valve 71 exceeds a particular limit such as approximately two hundred pounds per square inch (200 psi). In this way, the jacks 12, 14, 16 and 18 are extended to the ground, after the levelling of the vehicle 10 relative to gravity, with a low force that the levelling is not disturbed. The relief valve 72 may be constructed in a conventional manner.

A hydraulic pressure switch 74 may be constructed in a conventional manner. The switch 74 may respond to a particular pressure such as approximately twenty-five hundred pounds per square inch (2,500 psi). When the switch 74 responds to such a pressure, it informs a microcomputer in FIG. 12 that this pressure limit has been reached. The microcomputer then discontinues the extension of the jack providing this hydraulic pressure and produces commands to the hydraulic system to obtain the extension of the next jack in the sequence after a delay sufficient in time for all transients in the movement of the vehicle 10 to disappear. A pressure as high as twenty-five hundred pounds per square inch (2,500 psi) may illustratively be produced in a jack when the jack has been fully extended or when excessive pressure is imposed on the jack for some reason.

A bleeder valve generally indicated at 78 is also included in the hydraulic circuit in FIG. 2 and is connected between the hydraulic line 79 and the reservoir 26. The construction of the bleeder valve 78 is shown in detail in FIG. 9. The valve 78 is operative at a particular pressure less than approximately six hundred pounds per square inch (600 psi) to bleed hydraulic fluid from the line 79 to the reservoir 26. This is desirable because heat from the vehicle 10, while travelling or from the sun, may cause the pressure of the hydraulic fluid in the jack actuators 39 to increase to a level sufficient to cause the jacks 10, 12, 14 and 16 to be individually pivoted from the horizontal position to the vertical position even while the vehicle 10 is travelling between destinations. As will be appreciated, such an occurrence may be unfortunate because, at the very least, the jacks can be severely damaged when the vehicle travels over a bump. By slowly bleeding the fluid through the relief valve 78 below a pressure such as six hundred pounds per square inch (600 psi), the pressure of the fluid in the jacks can never be built to a value where the jacks can be inadvertently pivoted from the horizontal position to the vertical position.

When the vehicle is travelling between destinations, the air bags in the vehicle are filled with air to cushion the ride of the vehicle and enhance the comfort of the passengers in the vehicle. These air bags are schematically illustrated at 83 in FIG. 14. Before the jacks 12, 14, 16 and 18 are extended vertically, the air in the air bags is exhausted to allow the vehicle to settle to the positions where they are supported only by the axles of the vehicle. This is accomplished only under the control of the microprocessor shown in FIG. 3.

When the hydraulic system shown in FIG. 2 is to be operated, the motor 20 drives the pump 22 to produce a flow of hydraulic fluid. The pump 22 then introduces hydraulic fluid to the pressure switch 30, which is normally closed to prevent fluid from flowing through the switch. When the pressure of the hydraulic fluid reaches a preset value such as six hundred pounds per square inch (600 psi), the switch 30 is operated to provide for a delivery of fluid to the members 39 in the hydraulic jacks 10, 12, 14 and 16. The jacks are then operated to pivot the extensible arms in the jacks from the horizontal to the vertical positions.

After the extensible arms of the jacks 10, 12, 14 and 16 have been pivoted to the vertical positions, the jacks are extended downwardly in a particular sequence. This sequence is dependent upon the direction, or directions, in which the vehicle 10 is tilted relative to gravity. The sequential operation of the jacks occurs through hydraulic circuits including the pump 22, the pressure switch 30 and the valves 37, 40, 42 and 44. The sequential operation of the jacks continues until the vehicle has been levelled relative to gravity. The vehicle is generally levelled in a relatively short time period such as a period less than one (1) minute. A delay is generally provided between the extension of the arm in each jack in the sequence and the extension of the arm in the next jack in the sequence. This delay is provided to make sure that transients in each correction of the vertical disposition of the vehicle relative to gravity in one direction, by the operation of any particular one of the jacks 10, 12, 14 and 16, will not affect such corrections in any other direction such as by the operation of any of the other jacks.

It may sometimes happen that a jack may experience pressures as high as twenty-five hundred pounds per square inch (2,500 psi) as it is being extended. This may result from an extension of the jack to its full length. When this pressure is produced, the switch 74 produces a signal which the microcomputer processes. The microcomputer then instructs the next jack in the sequence to become extended after a suitable delay to eliminate any transients in the movement of the vehicle 10.

As previously explained, one or more of the jacks 12, 14, 16 and 18 may not be engaging the ground even after the vehicle has been levelled. The valve 68 then becomes operated to extend downwardly the arms of those jacks which still do not engage the ground. This occurs by a flow of fluid through the appropriate ones of the check valves 64, 66, 68 and 70 and the valve 68. Such jacks are then extended downwardly until they engage the ground with a pressure such as two hundred pounds per square inch (200 psi). This extension of the appropriate ones of the jacks 12, 14, 16 and 18 facilitates the stabilization of the vehicle 10. It also prevents the levelling of the vehicle 10 relative to gravity from being upset by the downward extension of such jacks, particularly since the jacks are extended until they receive only a relatively low pressure.

After the recreational vehicle has been levelled relative to gravity and stabilized, the vehicle 10 is maintained in this position until the occupants of the vehicle are ready to travel to another camp site or to another destination. At such time, the extendible arms of the jacks 12, 14, 16 and 18 are retracted and are then pivoted to the horizontal positions. The valve 78 is thereafter effective to bleed from the jacks 12, 14, 16 and 18 any fluid producing a pressure in the jacks of less than six hundred pounds per square inch (600 psi). By bleeding the hydraulic fluid from the jacks to prevent the pressures of the fluids in the jacks from accumulating, the jacks 12, 14, 16 and 18 cannot be inadvertently pivoted from the horizontal position to the vertical position while the vehicle 10 is travelling between destinations. This prevents the jacks from becoming inadvertently damaged.

The hydraulic circuit includes certain fail-safe features. For example, the pump 22 is short circuited to the reservoir 26 through the valve 24 when the fluid from the pump exceeds three thousand pounds per square inch (3,000 psi). The hydraulic circuitry shown in FIG. 2 also prevents the pressure of the fluid in the circuit from exceeding twenty-five hundred pounds per square inch (2,500 psi) while the jacks are being extended to level the vehicle relative to ground.

The embodiment of the invention also includes a switching assembly 80 in FIGS. 4 and 5. The switching assembly includes a plurality of switches such as the switches 82, 84, 86, 88 and 90 disposed on a support member 91. Each of the switches 82, 84, 86, 88 and 90 may be constructed in a similar manner. For example, the switch 88 may be provided with a pair of spaced contacts 92 and 94 disposed within an envelope 96.

A blob 98 of a suitably conductive fluid such as mercury is also disposed in the envelope 96. The blob 98 of conductive material is movable into engagement with the contacts 92 and 94 in accordance with the tilting of the recreational vehicle 10 from a horizontal level. When the blob 98 of conductive material engages the contacts 92 and 94, it produces an electrical continuity between the contacts. The blob 98 of conductive material is moved away from the contacts 92 and 94 when the recreational vehicle 10 is tilted in an opposite direction.

The switches 82, 84, 86 and 88 are disposed on the support member 91 to point towards the four corners of the recreational vehicle. For example, the switches 82, 84, 86 and 88 respectively point toward the left front, the right front, the right rear and the left rear corners of the recreational vehicle. Thus, the switch 86 becomes closed when the recreational vehicle 10 is tilted downwardly relative to gravity toward the left front end of the vehicle and the switch 82 becomes closed when the recreational vehicle 10 is tilted downwardly relative to gravity toward the right rear end of the vehicle. When the switch 86 becomes closed, the associated jack 12 becomes extended to raise the left front end of the vehicle from the ground. When the switch 82 becomes closed, the associated jack 16 becomes extended to raise the right rear end of the vehicle from the ground.

The switch 90 is disposed between the switches 82 and 84 and is extended in a direction parallel to the side walls of the vehicle. The switch 90 becomes closed when the recreational vehicle 10 is tilted downwardly toward the rear. As shown in FIG. 5, the switch 90 is connected in series with each of the switches 82 and 84. This means that the rear end of the vehicle 10 can be lifted only when both the switch 90 and one of the switches 82 and 84 are simultaneously closed. As a practical matter, this provides a preference to an initial lifting of the rear of the vehicle (by a closure of one of the switches 84 and 86) than an initial lifting of the front of the vehicle. This is desirable because the rear of the vehicle is heavier than the front of the vehicle. Thus, if there is any ambiguity in resolving the particular one of the jacks to be operated first, the ambiguity is resolved in favor of operating one of the rear jacks before one of the front jacks.

The hydraulic pressure switch 30 in FIG. 2 is shown in detail in FIG. 8. It includes a hollow housing 100 internally threaded as at 102. A plug 104 is screwed on the threads 102 and is provided with a bore 106 which communicates with the hollow interior of the housing 100. The bore 106 is internally threaded as at 108 to receive a hollow threaded fitting 110.

The housing 100 is provided with an internal shoulder 112 to limit the axial movement of a guide 114 toward the right in FIG. 8. The housing 110 is also provided with an internal wall 116 at a position displaced from the guide 114. A helical spring 118 is disposed between the guide 114 and the wall 116 under constrained relationship. The guide 114 is provided with ports 120 so that fluid in the housing on one side of the guide 114 can communicate with fluid on the other side of the guide.

A piston 122 is mechanically coupled to the guide 114 by means of a threaded bolt 124. A pair of spaced rings 126 are disposed in sockets in the piston 122 at the right end of the piston in FIG. 8 and are accordingly movable with the piston. 0-rings 128 are disposed in the sockets between the rings 126 and the piston to prevent fluid from leaking past the rings. The rings 126 are provided with an external diameter corresponding substantially to the internal diameter defining the hollow interior of the housing 100. The rings 126 are disposed adjacent ports 130 in the housing. 0-rings 132 and 134 are disposed on the external surface of the housing 100 to seal the housing in an assembly which includes the hydraulic pressure switch 30.

The hydraulic fluid from the pump 22 in FIG. 2 flows into the housing 100 through the fitting 110. When the pressure of the fluid in the housing 110 is relatively low, the force on the constrained spring 118 is able to move the piston 122 to the left in FIG. 8 to a position where the rings 126 are to the left of the ports 130. This prevents any fluid in the housing 100 from flowing through the ports 130.

When the pressure of the hydraulic fluid in the housing 100 is greater than a particular value such as approximately six hundred pounds per square inch (600 psi), this pressure is able to overcome the bias provided by the constrained spring 118. The piston 122 is accordingly moved to the position shown in FIG. 8. This opens the ports 130 so that fluid is able to flow through the ports 130. This fluid is then introduced intitally to the line 32 in FIG. 2 for operating the valve 36. This causes the jacks 12, 14, 16 and 18 to be pivoted from the horizontal position to the vertical position. The fluid is then introduced to the jacks 12, 14, 16 and 18 to extend the jacks sequentially.

The construction of the valve 36 in FIG. 2 is shown in detail in FIG. 7. In the embodiment shown in FIG. 7, a hollow housing 200 made from a suitable material such as steel is internally threaded at its right end to receive a plug 202. The plug 202 may be made from a relatively soft material such as aluminum and is provided with a passage 204.

A core member 206 made from a suitable member such as steel is fixedly disposed in the housing 200. The core member 206 is sealed relative to the housing 200 by 0-rings 208. An armature 210 made from a suitable material such as steel is also disposed in the housing at substantially the same radial level as the core member 206 and in adjacent axial relationship to the core member.

The housing 200, the core member 206 and the armature 210 define a compartment 212. A winding 214 is disposed in the compartment 212 and is immersed in oil in the compartment. The housing 200, the core member 206 and the armature 210 define a closed magnetic path through which magnetic flux passes when the winding 214 is energized. The flow of this magnetic flux causes the armature 210 to be moved to the left.

A hollow spacer 216 is disposed in the housing 200 at the left end of the housing in FIG. 7 to maintain the core member 206 in fixed relationship. A guide member 218 is disposed within the spacer 216 for axial movement within the spacer. A helical spring 220 is retained in a constrained relationship between the guide member 218 and the wall of the housing.

A dowel 222 extends through the core member 206 from a socket in the guide member 218. The dowel 222 extends through a passage 224 in the core member 206. The dowel 222 contacts a spacer 226 at its right ends. A needle 230 extends from the spacer 226 through the armature 210 into the passage 204. At its left end in FIG. 7, the needle 230 has a flared portion 228 which engages the wall of the armature 210. Bearings 232 are disposed on the needle 230. The bearings 232 are closely spaced relative to the wall defining the passage 204.

The end of the needle 230 is provided with a tapered configuration, preferably relatively gradual, as at 236. In one position of the needle 230, the tapered portion 236 of the needle 230 cooperates with a valve seat 238 to define a closed valve. The valve seat 238 is defined by a tapered shoulder in the wall defining the passage 204. The taper of the shoulder defining the valve seat 238 is preferably steeper than that provided on the end 236 of the needle 230 to facilitate valve closure.

The needle 230 is displaced from the wall defining the passage 204 to define a channel 240. An aperture 242 is disposed in the plug 202 at positions adjacent the channel 240 to communicate with the channel. 0-rings 246 and 248 are disposed at spaced positions on the external wall of the housing to seal the housing in the assembly which includes the housing.

During the time that the solenoid winding 212 is not being energized, the spring 220 acts through the guide member 218 on the dowel 222 to move the dowel, the spacer 226 and the needle 230 toward the right in FIG. 7. This causes the valve defined by the tapered portion 236 of the needle and the valve seat 238 to become closed. When this valve is closed, fluid cannot flow through a hydraulic circuit including the aperture 242 and the passage 204.

The solenoid winding 212 is energized when the extensible arms of the jacks 12, 14, 16 and 18 in FIGS. 1 and 2 are to be pivoted from the horizontal position to the vertical portion for subsequent extension. When the solenoid winding 212 is energized, the flow of magnetic flux through the magnetic circuit defined by the housing 200, the core member 206 and the armature 210 causes the armature to be moved to the left in FIG. 7. The movement of the armature 210 to the left causes the armature to act upon the flared portion 228 of the needle 230 to move the spacer 226 and the dowel 222 to the left in FIG. 7. The dowel 222 acts upon the guide member 218 to compress the spring 220.

When the armature 210 is moved to the left, the fluid in the channel 240 acts upon the needle 230 to move the needle to the left in FIG. 7. This displaces the tapered end 236 of the needle 230 from the valve seat 238 so that fluid is able to flow through the hydraulic circuit including the aperture 242 and the passage 204. The fluid flowing from the passage 204 acts upon the jacks 12, 14, 16 and 18 to pivot the extensible arms of the jacks from their horizontal positions to their vertical positions.

The apparatus shown in FIG. 7 and disclosed above has certain important advantages. It provides for a positive opening and closing of the valve formed by the tapered end 236 of the needle 230 and the valve seat 238. This results in part from the provision of the solenoid winding 212 and the provision of the magnetic circuit formed by the housing 200, the core member 206 and the armature 210. It further results from the force exerted by the fluid in the channel 224 against the needle 230.

The apparatus shown in FIG. 7 and disclosed above also has other important advantages. The fluid in the aperture 242 communicates through the bearings 232 and then acts against the spring 220, through the action of the dowel 222, tending to compress the spring. This means that the magnetic force generated by energizing the solenoid winding 214 to open the valve is reduced rather than increased as in a conventional valve when the pressure of the hydraulic fluid is increased in the aperture 242.

Another advantage occurs as the pressure of the fluid in the passage 204 increases to a value of approximately forty-five hundred pounds per square inch (4,500 psi). When this occurs, the force acts against the needle 230, the spacer 226, the dowel 222 and the guide member 218 to compress the spring 220. This allows fluid to pass through the valve defined by the seat 238 and the needle 230. The valve thus serves as a safety valve to protect the jacks in the event that the vehicle 10 is moved.

There are other advantages to the apparatus of FIG. 7. These advantages result from the fact that the valve defined by the tapered end 236 of the needle 230 and the valve seat 238 is closed gently, and without any chattering, when the solenoid winding 212 is de-energized. This results from the relative tapers on the portion 236 of the needle 230 and the valve seat 238. It also results in part from the formation of the valve seat 238 from a soft material such as aluminum. It further results from the formation of the dowel 222, the spacer 226 and the needle 230 as separate parts. By providing such separate parts, the movements of the needle 230 are damped relative to any movements imparted to the dowel 222. This is particularly true since the parts are disposed in oil. The dampened movements of the needle 230 also result from the action of the flared portion 228 of the needle 230 on the armature 210 in moving the armature to the right in FIG. 7. Since the armature 210 is a relatively heavy member, its inertia causes it to move to the right independently of the movement of the needle 230. As a result, the tapered end 236 of the needle 230 is able to engage the valve seat 238 gently without producing any damage in these members.

FIG. 9 illustrates in detail the construction of the bleeder valve 78 shown in FIG. 2. The valve 78 includes a housing 300 internally bored to define a channel 302 at the left end in FIG. 9 and an enlarged chamber 318 at the right end in FIG. 9. The channel 302 is shaped at the left end in FIG. 9 to define a seat 304. The seat 304 is preferably tapered. A tapered shoulder 306 is also provided between the channel 302 and the chamber 318 to provide a continuity between the channel and the chamber. The internal bore of the channel 302 is shaped to define a valve seat 307.

A plunger 308 is disposed in the channel 302 for axial movement and is retained within the channel 302 by the seat 304. The plunger 308 has a ball 310 at the left end in FIG. 9. The ball 310 cooperates with the valve seat 307 to define a valve. In the position of the ball 310 in FIG. 9, the valve is open. The ball 310 is provided with a relatively large diameter compared to the diameter of the channel 302 to limit the rate at which fluid is able to flow through the channel when the valve defined by the ball 310 and the valve seat 304 becomes opened. When the plunger is moved to the right in FIG. 9, the valve becomes closed.

The plunger 310 has an enlarged sleeve portion 312 and also has a tapered portion 314 which is disposed between the reduced portion at the left end of the plunger and the sleeve portion 312. The taper of the portion 314 is adjacent the shoulder 306 and is more gradual than that of the shoulder 306 in the channel 302.

A retaining ring 316 is disposed in the enlarged chamber 318 of the housing 300 adjacent the sleeve 312 for movement with the plunger. The retainer ring 316 abuts a snap ring 320 which is disposed on the periphery of the sleeve 312. The retainer ring 316 provides for an axial movement of the snap ring with the retainer ring. A snap ring 322 is fixedly disposed in the chamber 318 in spaced relationship to the ring 6. A helical spring 324 is disposed on the sleeve 312 in a constrained relationship between the snap rings 316 and 322.

The spring 324 normally biases the snap ring 320 and the retainer ring 316 toward the left in FIG. 9. In this relationship, the valve defined by the valve seat 307 and the ball 310 is open when the force of the spring is greater than the force of the fluid acting on the ball 310 at the left end in FIG. 9. As a result, fluid is able to flow the channel 302 and the chamber 318. This flow of fluid prevents any build-up of pressure in the jacks 12, 14, 16 and 18 during the time that the jacks are in their horizontal positions such as when the vehicle 10 is travelling between destinations.

When the force of the fluid acting on the ball 310 is greater than a particular value such as approximately six hundred pounds per square inch (600 psi), the force of the fluid exceeds the bias of the spring 324. This causes the plunger 308 to move to the right in FIG. 9 so as to close the valve defined by the valve seat 307 and the ball 310. Fluid is then unable to flow through the the channel 302 and the chamber 318. This prevents the bleeder valve 78 from acting to bleed fluid during the time that the hydraulic circuitry shown in FIG. 2 is acting to pivot the jacks 12, 14, 16 and 18 from the horizontal position to the vertical position and during the time that the jacks are being extended.

FIG. 6 is a side view of a jack which may be used in g the embodiment discussed above. FIG. 6 corresponds substantially to FIG. 4 of my U.S. Pat. No. 4,165,861. Assuming a support assembly 350 to be in an upper storage position as shown in FIG. 6, the outer end of a plunger 352 will react against a roller 354 as the plunger is extended from a cylinder 356. Such a reaction will cause the support assembly 350 to rotate around pivots 358 while the outer end of the plunger 352 rotates around the roller 354. When the pivotal movement of the plunger 352 has been completed, a plunger 360 is extended upon introduction of a suitable hydraulic fluid. Such extension is limited by abutment between a shoulder 366 in the interior wall of a cylinder 368 and a stop collar 370 carried on the plunger 360. A foot or pad 380 serves to provide a relatively large flat surface for contact with the ground.

FIG. 3 schematically shows an electrical system generally indicated at 400 and including a microprocessor 402, for operating in the proper sequence the different mechanisms discussed above. The system shown in FIG. 3 also includes a master switch 404 and an "Automatic Level" switch 406 for controlling the operation of the system. When the master switch 404 and the "Automatic Level" switch 406 are closed as first steps (indicated as "A" in FIG. 3) in the sequence, the microprocessor 402 is operative to energize the motor 20 in FIG. 2, as indicated by a letter "B" in FIG. 3. The motor 20 then operates the pump 22 to obtain a flow of fluid through the hydraulic circuit shown in FIG. 3. The solenoid in the valve 36 is then energized, in accordance with the processing of data by the microprocessor 402, to obtain a flow of fluid through the jacks 12, 14, 16 and 18 to pivot the extensible arms of the jacks from the horizontal positions to the vertical positions. This is indicated by a letter "C" in FIG. 3. As previously disclosed, however, this step may be eliminated if the jacks are only vertically extensible without first being pivoted from the horizontal position to the vertical position.

The microprocessor 402 is then operative to obtain an exhaustion of the air in the air bags 83 for (FIG. 14) cushioning the ride of the vehicle 10. This is indicated by a line 408 extending from the microprocessor 402 to a box 410 designated as "Exhaust Air From Air Bags in Vehicle 10". It is also indicated by a letter "D" adjacent the line 408 to show that this is the next step in the sequence after the pivoting of the jacks from the horizontal position to the vertical position.

The solenoids in the valves 37, 40, 42 and 44 are then energized in a particular sequence to level the recreational vehicle relative to gravity. This is indicated by a letter "E" in FIG. 3. The sequence of energizing the solenoids in the valves 37, 40, 42 and 44 is dependent upon the particular direction or directions in which the recreational vehicle is tilted downwardly relative to gravity. As previously described, preference is given by the switching circuitry shown in FIGS. 4 and 5 to operate the jacks at the rear of the vehicle before the jacks at the front of the vehicle in case of any ambiguity in the sequence of operating the jacks because the rear of the vehicle is heavier than the front of the vehicle. By raising the rear of the vehicle before the front of the vehicle, only a minimal extension may have to be made in the jacks at the front of the vehicle in order to level the vehicle.

Although preference is given to levelling the rear of the vehicle 10 over levelling the front of the vehicle in case there is any ambiguity, the sequence of operating the jacks 12, 14, 16 and 18 is actually dependent upon the direction in which the vehicle is tilted. The first one of the jacks 12, 14, 16 and 18 to be levelled is that one which is skewed the most from the direction of gravity. This selection is made by the microprocessor 402 in accordance with the closure of the switches shown in FIGS. 4 and 5. Generally one of the jacks adjacent such first selected jack is the next to be selected since it is the jack most skewed from the direction of gravity after the corner of the vehicle corresponding to the positioning of the first selected jack has been made level relative to gravity.

When the second one of the selected jacks has been extended sufficiently to make the corresponding corner of the vehicle level relative to gravity, the third jack is then operated. This third jack is adjacent generally to the second selected jack in the same direction of rotation as from the first jack to the second jack. The fourth jack selected for extension is in turn generally adjacent to the third selected jack in the same direction of rotation as from the second jack to the third jack.

It may be that the levelling operation relative to gravity is not yet consummated after the four (4) jacks have been operated in sequence. If such levelling relative to gravity is not yet consummated, the four jacks are again operated in the same sequence until the levelling has been consummated. Generally the levelling relative to gravity is consummated after only one sequence of operating the different jacks or, at most, after only two (2) sequences of operating the different jacks. As will be appreciated, the operation of the jacks through only one sequence or through more than one sequence is controlled by the microprocessor 402. Thus, although the operation of the solenoids in the valves 38, 40, 42 and 42 is indicated by the single letter "E" in FIG. 3, it will be appreciated that the operation of those valves may occur through a number of steps, all under the control of the microprocessor 402.

After each operation of one of the jacks 12, 14, 16 and 18, a delay is provided by the microprocessor 402 before the next one of the jacks in the sequence is operated. This is indicated by delays 412 and 414 in FIG. 3. These delays are provided so that any transients in the movement of the vehicle 10 as a result of the operation of each jack will be dissipated before the next one of the jacks in the sequence is operated The delay is provided for each jack after the operation of the jack is interrupted by the conversion of the associated switch in FIGS. 4 and 5 from a closed state to an open state. It will be appreciated that the delays 412 and 414 are shown in FIG. 3 as being associated with the microprocessor 402 since the delays may be provided as a result of the programming of the microprocessor 414.

The microprocessor 402 senses when the vehicle 10 is levelled relative to gravity because all of the switches in FIGS. 4 and 5 are simultaneously opened. When the vehicle 10 is levelled relative to gravity, the microprocessor 402 causes the solenoid in the valve 71 to be energized after a suitable time delay. This produces an operation of all of the jacks 12, 14, 16 and 18 still not contacting the ground. Such jacks are operated until they engage the ground. Such operation is indicated by a letter "F" in FIG. 3. In this way, the stability of the vehicle 10 is enhanced without affecting the levelling previously provided in the vehicle.

When it is desired to prepare the vehicle 10 for departure from a campsite, the "Master" switch 404 and an "Automatic Retract" switch 420 are operated. When the "Master" switch 404 is on and the "Automatic Retract" switch 420 is closed, the microprocessor 402 causes the valves 36, 37, 40, 42 and 44 so that the fluid in the jacks 12, 14, 16 and 18 is returned to the reservoir 26 and the extendible arms in the jacks become retracted. Such retraction of the jacks 12, 14, 16 and 18 can occur simultaneously or in sequence. The retraction of the jacks 12, 14, 16 and 18 and the pivoting of the jacks to the horizontal position occur because of the force of the retracting springs on the jacks.

It will be appreciated that the system shown in FIG. 2 can be operated manually as well as automatically. This can be accomplished by providing a manually operated switch for each jack and by manually operating the switch until an indication is provided on a visual sensor that the vehicle 10 has been levelled at the position on the vehicle corresponding to the position where the jack is coupled to the vehicle. However, when the "Automatic Level" switch 406 is operated, the automatic levelling of the vehicle 10 has a priority over any manual levelling of the vehicle 10.

As will be appreciated, levelling of a recreational vehicle can be provided by controlling the vertical disposition of three (3) spaced points relative to gravity. For example, the levelling of a recreational vehicle, generally indicated at 500 in FIG. 10, relative to gravity can be controlled by three jacks generally indicated at 502, 504 and 506. The jacks 502, 504 and 506 are disposed at spaced positions on the vehicle at the underside of the vehicle. The jacks 504 and 506 may be disposed at the opposite rear ends of the vehicle 500 and the jack 502 may be disposed at the front of the vehicle at a position intermediate the front ends of the vehicle. Actually, the use of only three (3) jacks should be theoretically superior to the use of four (4) jacks as in the previous embodiment shown in FIGS. 1 through 9 since an object can be levelled by levelling only three (3) spaced positions on the object. The jacks 504 and 506 are disposed at the opposite rear ends of the vehicle 500 since the rear end of the vehicle is heavier than the front of the vehicle.

Since the length of the vehicle 500 is generally significantly longer than its width, the jacks 502, 504 and 506 do not define an equilateral triangle but only an isosceles triangle. This results from the fact that the distance between the jacks 504 and 506 is considerably less than the distance between the jacks 502 and 506 or between the jacks 502 and 504. In view of the particular geometry involved, problems may arise in the priorities of operating the jacks 502, 504 and 506 if the recreational vehicle should be tilted downwardly toward the rear relative to gravity.

Any ambiguities in the priorities of operating the jacks 502, 504 and 506 can be resolved by providing a switching arrangement such as shown in FIGS. 11 and 12. This arrangement includes a support member 510 on which a plurality of switches 512, 514 and 516 are disposed. The switches 512, 514 and 516 may be mercury switches and may be constructed in a manner similar to that disclosed above for the switches shown in FIGS. 4 and 5. The switches 512, 514 and 516 may be respectively disposed at positions to obtain an operation of the jacks 502, 504 and 506 when they are closed. For example, when the switch 512 is closed, it indicates that the vehicle 500 is tilted downwardly in the forward direction relative to gravity. This causes the jack 502 to be extended so that the front end of the vehicle 500 becomes raised relative to gravity.

A switch 518 is also disposed on the member 510 in addition to the switches 512, 514 and 516. The switch 518 is disposed opposite the switch 512 and is connected in parallel with the switch 514 (FIG. 12). The switch 518 may also be a mercury switch. The switch 518 is closed when the recreational vehicle 500 is tilted downwardly toward the rear. When the switch 518 is closed, the jack 506 is extended to tilt the right rear end of the vehicle upwardly. The jack 504 can then be extended to tilt the left rear end of the vehicle 500 upwardly. In this way, the inclusion of the switch 518 and the connection of this switch in parallel with the switch 514 provide a resolution as to any ambiguities in the sequence of operating the jacks when the rear end of the vehicle 500 is tilted downwardly.

FIG. 13 shows a hydraulic circuit for operating the jacks 502, 504 and 506 in sequence. The hydraulic circuit shown in FIG. 13 is similar to the circuit shown in FIG. 2 except for a limited number of differences. For example, only the three jacks 502, 504 and 506 are included. The extension of these jacks is respectively controlled by three valves generally indicated at 530, 532 and 534. Each of these valves may be constructed in a manner similar to that shown in FIG. 7. The hydraulic circuit shown in FIG. 13 also includes a pressure switch generally indicated at 536 and corresponding to that shown in FIG. 8.

As will be seen in FIG. 13, no valve is included to pivot the jacks 502, 504 and 506. This results from the fact that the jacks 502, 504 and 506 are not pivotable in this embodiment but are operative only to become extended and retracted. Hydraulic jacks of this type are well known in the prior art.

Although this invention has been disclosed and illustrated with reference to particular embodiments, the principles involved are susceptible for uses in numerous other embodiments which will be apparent to persons skilled in the art. The invention is, therefore, to be limited only as indicated by the scope of the appended claims.

I claim:

1. In combination for use in a vehicle with suspension means including inflatable air bags to level the vehicle relative to gravity,
    a plurality of jacks each disposed at an individual position relative to the vehicle and in displaced relationship to the other jacks for adjusting the vertical position of the vehicle at the individual positions relative to gravity,
    means disposed relative to the vehicle for sensing the tilting of the vehicle from a level disposition relative to gravity,
    means responsive to the sensing means for operating the jacks in a particular sequence to obtain an adjustment in the vertical position of the vehicle at the individual positions and to obtain a resultant levelling of the vehicle relative to gravity,
    means responsive to a levelling of the vehicle for lowering to the ground any of the jacks still displaced from the ground, and
    means for deflating the air bags before any operation of the jacks to level the vehicle.

2. A combination as set forth in claim 1 wherein the jacks are pivotable between horizontal and vertical positions and are normally disposed in the horizontal position while the recreational vehicle is travelling and wherein means are included for pivoting the jacks from the horizontal position to the vertical position before the vertical position of any of the jacks is adjusted.

3. A combination as set forth in claim 1 wherein
the jacks are hydraulic and means are includes for inhibiting the build-up of fluid pressures in the jacks below a first particular pressure to prevent the jacks from becoming extended at undesirable times and wherein means are included for obtaining an operation of the jacks when the fluid pressure in the jacks exceeds the first particular pressure.

4. In combination for use in a vehicle to level the vehicle relative to gravity, a plurality of jacks each disposed at an individual position relative to the vehicle and in displaced relationship to the other jacks for adjusting the vertical position of the vehicle at the individual positions relative to gravity, means disposed relative to the vehicle for sensing the tilting of the vehicle from a level disposition relative to gravity, means reponsive to the sensing means for operating the jacks in a particular sequence to obtain an adjustment in the vertical position of the vehicle at the individual positions and to obtain a resultant levelling of the vehicle relative to gravity, means responsive to a levelling of the vehicle for lowering to the ground any of the jacks still displaced from ground, and means responsive to each operation of at least one of the jacks for delaying the operation of any of the other jacks for a particular period of time to inhibit the levelling system from responding to transients.

5. A combination as set forth in claim 4 wherein
the vehicle is provided with air bags and the air bags are filled with air while the vehicle is travelling and wherein the air is exhausted out of the air bags before the vertical position of any of the jacks is adjusted to level the vehicle.

6. In combination for use in a vehicle to level the vehicle relative to gravity, a plurality of jacks disposed at strategic positions in operatively coupled relationship to the vehicle to support the vehicle on the ground, the jacks being extensible to adjust the positioning of the vehicle relative to gravity, means for sensing the level of the vehicle at the strategic positions at each instant relative to gravity, means responsive to the sensing means for obtaining extensions of the jacks in a particular sequence and through particular vertical distances to level the vehicle relative to gravity, a plurality of supension means including inflatable air bags, and means for deflating the air bags before extending any of the jacks.

7. A combination as set forth in claim 6 wherein
the jacks are pivotable between horizontal and vertical positions and are disposed in the horizontal position while the vehicle is travelling and wherein means are responsive to a first particular pressure in the jacks for obtaining a rotation of the jacks from the horizontal position to the vertical position before any of the jacks are extended.

8. In combination for use in a vehicle to level the vehicle relative to gravity, a plurality of jacks disposed at strategic positions in operatively coupled relationship to the vehicle to support the vehicle on the ground, the jacks being extensible to adjust the positioning of the vehicle relative to gravity, means for sensing the level of the vehicle at the strategic positions at each instant relative to gravity, and means responsive to the sensing means for obtaining extensions of the jacks in a particular sequence and through particular vertical distances to level the vehicle relative to gravity, and means for delaying the extension of each jack for a particular period of time after the extension of the previously operated jack to prevent transients in the disposition of the vehicle from affecting the levelling of the vehicle relative to gravity.

9. A combination as set forth in claim 8 wherein
the jacks are hydraulic and means are included for providing for an extension of the jacks only when the hydraulic pressure is above a first particular value and wherein means are included for preventing the pressure of the hydraulic fluid in the jacks from accumulating above the first particular value while the vehicle is travelling.

10. In combination for levelling a vehicle relative to gravity, a plurality of jacks movable relative to gravity and supported by the vehicle for adjustment of the vehicle relative to gravity, a support member, a plurality of switches disposed on the support member, each of the switches being associated with a particular one of the jacks and being operative to indicate a downward tilting of the vehicle at the position of the associated jack, and means associated with the jacks and responsive to the operation of the switches and to the occurrence of a first particular pressure in the jacks for operating the jacks in sequence to level the vehicle relative to gravity.

11. A combination as set forth in claim 10 wherein
the jacks are hydraulic and means are associated with the jacks for operating the jacks when the hydraulic pressures in the jack exceed the first particular value.

12. A combination as set forth in claim 10 wherein
the jacks are hydraulically operated and means are associated with the jacks for hydraulically by-passing the jacks when the hydraulic pressure in the jacks exceeds a second particular value greater than the first particular value.

13. In combination for levelling a vehicle relative to gravity, a plurality of jacks movable relative to gravity and supported by the vehicle for adjustment of the vehicle relative to gravity, a support member, a plurality of switches disposed on the support member, each of the switches being associated with a particular one of the jacks and being operative to indicate a downward tilting of the vehicle at the position of the associated jack, and means associated with the jacks and responsive to the operation of the switches for operating the jacks in sequence to level the vehicle relative to gravity, the jacks being hydraulic, means associated with the jacks for operating the jacks when the hydraulic pressures in the jacks exceed a particular value, and means for bleeding hydraulic fluid from the jacks to prevent the hydraulic pressure of the fluid in the jack from building above the particular value while the vehicle is travelling to prevent the jacks from becoming operative.

14. In combination for levelling a vehicle relative to gravity, a plurality of jacks movable relative to gravity and supported by the vehicle for adjustment of the vehicle relative to gravity, a support member, a plurality of switches disposed on the support member, each of the switches being associated with a particular one of the jacks and being operative to indicate a downward tilting of the vehicle at the position of the associated jack, means associated with the jacks and responsive to the operation of the switches for operating the jacks in sequence to level the vehicle relative to gravity, the jack being hydraulic, means associated with the jacks for operating the jacks when the hydraulic pressures in the jacks exceed a particular value, and means for bleeding the hydraulic fluid in the jacks to prevent hydraulic pressure from accumulating in the jacks while the vehicle is travelling.

15. In combination for levelling a vehicle, a plurality of jacks coupled to the vehicle at the underside of the vehicle at strategic positions around the periphery of the vehicle, each of the jacks being operative to raise or lower the vehicle relative to gravity at the strategic position at which it is disposed, a support member, a plurality of switches disposed on the support member, each of the switches having open and closed states and each being positioned to indicate the downward tilting of the vehicle relative to gravity in the direction of an individual one of the jacks in the plurality, circuit means including the switches and the jacks for activating individual ones of the jacks in accordance with the individual closure of the switches, means responsive to pressures greater than a particular value in the jacks for operating the jacks in sequence, in accordance with the vertical disposition of the vehicle relative to gravity at the positions of the jacks, to produce a levelling of the vehicle, and means responsive to the operation of the jacks in the sequence for initiating a new sequence in the operation of the jacks when the vehicle, still remains unlevel after the first sequence.

16. A combination as set forth in claim 15 wherein the vehicle includes suspension means including inflatable bags and the circuit means include control means associated with each of the jacks for becoming energized upon a closure of the switch associated with that jack and for producing an operation of the jack upon an energizing of the control means and wherein means are included for deflating the air bags before any operation of the jacks.

17. A combination as set forth in clam 16 wherein the jacks are hydraulic and wherein means are responsive to the energizing of the control means associated with each jack for completing a hydraulic circuit to that jack to produce a lowering of the jack.

18. A combination as set forth in claim 17 wherein means are included for obtaining a completion of the hydraulic circuit to each jack only upon the occurrence of at least the first particular hydraulic pressure in the hydraulic circuit to that jack.

19. A combination as set forth in claim 18 wherein the jacks are pivotable between horizontal and vertical positions and are normally disposed in the horizontal positions during the vehicle travel and wherein means are included for producing a pivotal movement of the jacks from the horizontal positions to the vertical positions before the jacks are operative to level the vehicle relative to gravity and after the air bags are deflated.

20. In combination for levelling a vehicle, a plurality of jacks coupled to the vehicle at the underside of the vehicle at strategic positions around the periphery of the vehicle, each of the jacks being operative to raise of lower the vehicle relative to gravity at the strategic position at which it is disposed, a support member, a plurality of switches disposed on the support member, each of the switches having open and closed states and each being positioned to indicate the downward tilting of the vehicle relative to gravity in the direction of an individual one of the jacks in the plurality, circuit means including the switches and the jacks for activating individual ones of the jacks in accordance with the individual closure of the switches, means responsive to pressures greater than a particular value in the jacks for operating the jacks in sequence, in accordance with the vertical disposition of the vehicle relative to gravity at the positions of the jacks, to produce a levelling of the vehicle, means for providing for a discontinuance in the operation of each individual jack to lower that jack when that jack experiences a second particular pressure greater than the first particular pressure, means responsive to the occurrence of the second particular pressure in any one of the jacks in the plurality for initiating the operation of the next one of the jacks in the sequence, and means responsive to a levelling of the vehicle for lowering the jacks still displaced from the ground until such jacks receive a third particular pressure less than the first and second particular pressures.

21. In combination for use in a vehicle to level the vehicle relative to gravity, a plurality of jacks each disposed at an individual position relative to the vehicle and in displaced relationship to the other jacks for adjusting the vertical position of the vehicle relative to gravity at the individual positions, a plurality of needle members each associated with an individual one of the jacks, means including a plurality of valve seats each associated with an individual one of the needle members to define a valve with the associated needle member, a plurality of solenoids each associated with an individual one of the needle members, means associated with each of the solenoids for actuation by the individual solenoids and coupled to the associated needle members for movement from the associated valve seat to open the associated valve, a pump, means responsive to the opening of each individual one of the valves for providing for a flow of fluid from the pump to the jack associated with the opened valve to obtain an operation of that jack, means operatively coupled to the solenoids in the different valves for energizing the solenoids in the different valves in a particular sequence, and means for repeating sequences in the operation of the jacks until the vehicle becomes level.

22. A combination as set forth in claim 21, including, means for biasing each of the needle members to a position against the associated valve seat for closing the associated valve, each of the solenoids being operative to overcome the bias of the associated biasing means and to move the associated needle member to a position for opening the associated valve, and the means for providing for the flow of fluid through each valve being operative upon the biasing means to overcome the bias of the biasing means against the needle member during the flow of fluid through the associated valve.

23. A combination as set forth in claim 21, including, means responsive to a levelling of the vehicle for advancing to the ground the jacks displaced from the ground after the levelling operation.

24. In combination for use in a vehicle to level the vehicle relative to gravity, a plurality of jacks each disposed at an individual position relative to the vehicle and in displaced relationship to the other jacks for adjusting the vertical position of the vehicle relative to gravity at the individual positions, a plurality of needle members each associated with an individual one of the jacks, means including a plurality of valve seats each associated with an individual one of the needle members to define a valve with associated needle member, a plurality of solenoids each associated with an individual one of the needle members, means associated with each of the solenoids for actuation by the individual solenoids and coupled to the associated needle members for movement from the associated seat to open the associated valve, means responsive to the opening of each individual one of the valves for providing for a flow of fluid from the pump to the jack associated with the opened valve to obtain an operation of that jack, means operatively coupled to the solenoids in the different valves for energizing the solenoids in the different valves in a particular sequence, and means responsive to the production of a particular fluid pressure in each of the jacks for providing for an energizing of the solenoid associated with the next valve in the sequence.

25. In combination for use in a vehicle to level the vehicle relative to gravity, a support member, a plurality of switches on the support member, the switches being operative in open and closed states and being disposed relative to the vehicle and being constructed to detect the tilting of the vehicle in different directions relative to gravity in accordance with the opening and closure of the switches, a plurality of jacks each supported by the vehicle and disposed at a strategic position on the vehicle to support the vehicle on the ground, each of the jacks being operative vertically to become extended and retracted, an additional switch included on the support member and being operative in open and closed states and being connected to at least a particular one of the switches in the plurality to resolve any ambiguities in favor of an initial operation of the jack disposed in a particular one of the strategic positions on the vehicle, and means responsive to the opening and closing of the switches in the plurality and the opening and closure of the additional switch for operating the jacks in a particular sequence related to the tilting of the vehicle relative to gravity.

26. A combination as set forth in claim 25 wherein each of the switches in the plurality and the additional switch include a housing and a pair of contacts spaced from each other in the housing and a fluidic medium movable in the housing in accordance with the disposition of the support member and having conductive properties to produce a continuity between the spaced contacts when the fluidic medium engages the contacts.

27. A combination as set forth in claim 26 wherein the rear of the vehicle is heavier than the front and the jacks in the plurality are disposed at the front and rear ends of the vehicle and the additional switch is connected to the particular switch to resolve any ambiguities in the initial operation of the jacks to favor at the rear ends of the vehicle.

28. A combination as set forth in claim 25 wherein the additional switch is connected to particular ones of the switches in the plurality to resolve ambiguities in the priorities of operating the different jacks in the plurality.

29. A combination as set forth in claim 28 wherein four jacks are provided in the plurality and the jacks are disposed at the four corners of the vehicle and the switches in the plurality are disposed on the support member to point toward the four corners of the vehicle and the additional switch is disposed in a direction extending substantially between the front and the rear of the vehicle and is connected in circuitry with the switches pointing toward the rear corners of the vehicle to resolve any ambiguities in the operation of the jacks, under normal circumstances, in favor of at least one of the rear jacks before the operation of the front jacks.

30. A combination as set forth in claim 28 wherein three jacks are provided in the plurality and the jacks are disposed to define a triangle with two of the jacks disposed at the rear corners of the vehicle and the third jack disposed at the front end of the vehicle intermediate the front corners and three switches are provided in the plurality and the three switches are disposed on the support member to point towards individual ones of the jacks and the additional switch is disposed to point toward the rear of the vehicle and the additional switch is connected to the switch pointed in the plurality toward a particular one of the rear walls to resolve any ambiguities in the initial operation of the jacks, under normal circumstances, in favor of a particular one of the rear jacks upon a downward tilting of the rear end of the vehicle.

31. In combination for use in a vehicle to level the vehicle relative to gravity,
  a support member supported by the vehicle for tilting relative to gravity in accordance with the tilting of the vehicle relative to gravity,
  a plurality of switches on the support member, the switches being operative in open and closed states and being constructed to become opened and closed in accordance with the tilting of the support member,
  a plurality of jacks each supported by the vehicle and disposed at a strategic position on the vehicle to support the vehicle on the ground, each of the jacks being operative vertically to become extended and retracted,
  each of the switches being disposed on the support member to indicate the tilting of the vehicle relative to gravity at one of the strategic positions,
  means responsive to the opening and closing of the different switches in the plurality in accordance with the tilting of the vehicle relative to gravity for operating the jacks vertically in a particular sequence related to the directions in which the vehicle is tilted relative to gravity,
  means for interrupting the operation of each of the jacks vertically when the pressure in each of the jacks reaches a first particular value and for instituting the operation of the next jack in the sequence, and
  means responsive to a levelling of the vehicle for operating vertically any of the jacks still remaining unextended after the levelling of the vehicle and for interrupting the vertical operation of each such jack when the pressure in the jack has second particular pressure less than the first particular pressure.

32. A combination as set forth in claim 31 wherein
  each of the switches includes a housing and a pair of spaced contacts in the housing at one end of the housing and a conductive fluid disposed in the housing and movable in the housing to establish an electrical continuity with the spaced contacts dependent upon the direction of tilting of the support member relative to gravity.

33. A combination as set forth in claim 32 wherein
  each switch in the plurality is disposed at the end of the support member opposite the position of the associated jack and the pair of spaced contacts in that switch are disposed at the end of the switch closest to the associated jack.

34. In combination for use in a vehicle to level the vehicle relative to gravity,
  a support member supported by the vehicle for tilting relative to gravity in accordance with the tilting of the vehicle relative to gravity,
  a plurality of switches on the support member, the switches being operative in open and closed states and being constructed to become opened and closed in accordance with the tilting of the support member,
  a plurality of jacks each supported by the vehicle and disposed at a strategic position on the vehicle to support the vehicle on the ground, each of the jacks being operative vertically to become extended and retracted,
  each of the switches being disposed on the support member to indicate the tilting of the vehicle relative to gravity at one of the strategic positions,
  means responsive to the opening and closing of the different switches in the plurality in accordance with the tilting of the vehicle relative to gravity for operating the jacks vertically in a particular sequence related to the directions in which the vehicle is titled relative to gravity,
  each of the switches including a housing and a pair of spaced contacts in the housing at one end of the housing and a conductive fluid disposed in the housing and movable in the housing to establish an electrical continuity with the spaced contacts dependent upon the direction of tilting of the support member relative to gravity,
  each switch in the plurality being disposed at the end of the support member opposite the position of the associated jack and the pair of spaced contacts in that switch being disposed at the end of the switch closest to the associated jack, and
  an additional switch disposed on the support member and connected to at least a particular one of the switches in the plurality to resolve any ambiguities in the priorities in which the jack are operated.

35. A combination as set forth in claim 34 wherein
  the weight at the rear end of the vehicle is greater than the weight at the front end of the vehicle and wherein the additional switch is connected to at least the particular switch in the plurality to resolve any ambiguities in the priorities of operating one jack, in favor of levelling the front end of the vehicle relative to gravity before levelling the front end of the vehicle relative to gravity.

36. In combination for use in a vehicle to level the vehicle relative to gravity,
  a pump for delivering hydraulic fluid,
  means responsive to the operation of the pump for providing for the introduction of fluid from the pump for fluid pressures above a particualr value,
  a plurality of jacks disposed at strategic positions on the vehicle and hydraulically operative to raise or lower the vehicle at the strategic positions,
  means responsive to the dispositions of the vehicle relative to gravity at the strategic positions on the vehicle for providing signals indicating the particular jack to be hydraulically operated at each instant,
  means responsive to the signal means and the fluid-introducing means for obtaining a hydraulic operation of the jacks in a particular sequence, in accordance with the introduction of hydraulic fluid from the pump, dependent upon the characteristics of the signals provided by the signal means, and
  means responsive to the operation of the jacks in the sequence for obtaining a hydraulic operation of the jacks in a subsequent sequence if the vehicle has not been levelled after the first sequence.

37. A combination as set forth in claim 36, including,
  means responsive to the operation of the signal means in indicating a levelling of the vehicle for operating the jacks still displaced from the ground to displace such jacks to positions engaging the ground.

38. A combination as set forth in claim 37 wherein
the jacks are pivotable between horizontal and vertical portions and are normally disposed in the horizontal positions and wherein
means are hydraulically operative to obtain a pivotal movement of the jacks from the horizontal positions to the vertical positions before the hydraulic operation of the jacks to level the vehicle relative to gravity.

39. In combination for use in a vehicle to level the vehicle relative to gravity,
a pump for delivering hydraulic fluid,
means responsive to the operation of the pump for providing for the introduction of fluid from the pump for fluid pressure above a particular value,
a plurality of jacks disposed at strategic positions on the vehicle and hydraulically operative to raise or lower the vehicle at the strategic positions,
means responsive to the dispositions of the vehicle relative to gravity at the strategic positions on the vehicle for providing signals indicating the particular jack to be hydraulically operated at each instant,
means responsive to the signal means and the fluid-introducing means for obtaining a hydraulic operation of the jacks in a particular sequence, in accordance with the introduction of hydraulic fluid from the pump, dependent upon the characteristics of the signals provided by the signal means, and
means responsive to a particular pressure in the jack being operated at each instant for obtaining an interruption in the operation of that jack and for initiating an operation of the next jack in the sequence.

40. In combination for use in a vehicle to level the vehicle relative to gravity,
a pump for delivering hydraulic fluid,
means responsive to the operation of the pump for providing for the introduction of fluid from the pump for fluid pressures above a particular value,
a plurality of jacks disposed at strategic positions on the vehicle and hydraulically operative to raise or lower the vehicle at the strategic positions,
means responsive to the dispositions of the vehicle relative to gravity at the strategic positions on the vehicle for providing signals indicating the particular jack to be hydraulically operated at each instant,
means responsive to the signal means and the fluid-introducing means for obtaining a hydraulic operation of the jacks in a particular sequence, in accordance with the introduction of hydraulic fluid from the pump, dependent upon the characteristics of the signals provided by the signal means, and
means for providing a priority to an initial operation of the jacks in the plurality at the end of the vehicle with the greatest load distribution and a subsequent operation of the jacks in the plurality at the end of the vehicle with the lightest load distribution.

41. In combination for use in a vehicle to level the vehicle relative to the ground,
an energizable solenoid,
an armature responsive to the energizing of the solenoid for movement in accordance with such energizing,
a passage,
a needle member movable in the passage in accordance with the movement of the armature,
a valve seat disposed in the passage and cooperative with the needle member to define a valve,
the needle member being movable in accordance with the energizing of the solenoid to open the valve,
a pump,
a jack supported by the vehicle at a strategic position in the vehicle to become operated for extension or retraction and to adjust the vertical position of the vehicle relative to gravity at such strategic position in accordance with such extension or contraction,
means operatively coupled to the passage to obtain a flow of fluid through the passage from the pump to the jack to operate the jack when the valve becomes opened,
means for biasing the armature to a position for closing the valve, and
means operatively coupled to the solenoid for energizing the solenoid when the fluid to flow through the passage has at least a particular pressure in the jack.

42. A combination as set forth in claim 41 wherein
the fluid in the passage during the operation of the valve in the open position biases the biasing means away from the armature to provide for a minimal force on the armature in maintaining the valve in the open state.

43. In combination for use in a vehicle to level the vehicle relative to the ground,
an energizable solenoid,
an armature responsive to the energizing of the solenoid for movement in accordance with such energizing,
a passage,
a needle member movable in the passage in accordance with the movement of the armature,
a valve seat disposed in the passage and cooperative with the needle member to define a valve,
the needle member being movable in accordance with the energizing of the solenoid to open the valve,
a jack supported by the vehicle at a strategic position in the vehicle to become operated for extension or retraction and to adjust the vertical position of the vehicle relative to gravity at such strategic position in accordance with such extension or contraction,
means operatively coupled to the passage to obtain a flow of fluid through the passage from the pump to the jack to operate the jack when the valve becomes opened, and
means for biasing the armature to a position for closing the valve,
the armature being formed from at least a pair of members and the needle member being formed from at least a pair of members and the pair of members in the armature being disposed relative to the pair of members in the needle member to provide for a soft return of the needle member against the valve seat, independent of the movement of the armature, when the energizing of the solenoid becomes interrupted.

44. A combination as set forth in claim 43 wherein
the needle member is tapered at the end and the valve seat is tapered, but at a different angle from the taper in the needle member, to provide for a positive closure of the valve and wherein
the fluid in the passage during the operation of the valve in the open position biases the biasing means away from the armature to provide for a minimal force on the armature in maintaining the valve in the open state.

45. In combination for use in a vehicle to level the vehicle relative to gravity,
a plurality of jacks each disposed at a strategic position on the vehicle for supporting the vehicle and each extensible to adjust the vertical disposition of the vehicle relative to gravity, each of the jacks being hydraulic,
means responsive to the disposition of the vehicle in other than a level position relative to gravity for operating the jacks in a particular sequence to extend the jacks for producing a level disposition of the vehicle relative to gravity, and
means for producing a slow bleeding of fluid from the jacks when the fluid pressure in the jacks is below a particular value and for preventing the fluid from bleeding from the jacks when the fluid pressure in the jacks exceeds the particular value.

46. The combination set forth in claim 45, including,
means responsive to fluid pressures above a second particular value, greater than the first particular value, for each jack for interrupting the operation of the jack and producing an operation of the next jack in the sequence.

47. The combination set forth in claim 46, including,
means responsive to the operation of each jack for delaying the operation of the jack in the sequence for a particular period of time until the transients in the movement of the vehicle resulting from the operation of the first jack have settled.

48. The combination set forth in claim 45, including,
means responsive to the tilting of the vehicle relative to gravity for selecting, for initial operation, the jack furthest displaced relative to gravity and for thereafter operating the jack next furthest displaced relative to gravity and for thereafter operating the jacks in sequence.

49. A combination as recited in claim 45 wherein the bleeding means includes:
a passage for the flow of fluid,
a valve seat,
a piston movable in the passage,
a ball at the end of the piston and disposed in a first position in co-operative relationship with the valve seat to define an open valve with the valve seat and movable by the fluid to a second position displace from the valve seat to provide for an opening of the valve defined by the ball and the valve seat, the ball being slightly smaller than the passage to limit the rate at which the fluid flows through the passage, and
means for biasing the ball in displaced relationship to the valve seat.

50. In combination
a housing,
a reservoir,
a fluid passage in the housing, the fluid passage being open at first and second opposite ends and communicating with the reservoir at the second end,
a valve seat in the passage,
a plunger disposed in the passage for movement in the passage, the plunger being provided with dimensions to obtain a flow of fluid through the passage,
a sealing member disposed in the passage and operatively coupled to the plunger for movement with plunger in the passage, the sealing member being provided with a configuration relative to the valve seat to define with the valve seat a valve having open and closed positions,
means disposed in the passage for biasing the plunger to a position displaced from the valve seat to obtain a bleeding of the fluid through the passage to the reservoir when the pressure of the fluid in the passage is less than a particular value, and
means for introducing fluid to the passage to obtain a closure of the valve defined by the valve seat and the sealing member when the pressure of the fluid exceeds a particular value.

51. A combination as set forth in claim 50 wherein the sealing member constitutes a ball and the valve seat is disposed in a passage for receiving the ball and wherein the diameter of the ball is slightly less than the diameter of the passage to provide for a bleeding of fluid through the passage to the reservoir when the ball is displaced from the valve seat.

52. A combination as set forth in claim 50 wherein the biasing means constitutes a spring disposed in the passage in constrained relationship and wherein
a hydraulic jack is included and is provided with extensible characteristics and is provided with characteristics for becoming extended for hydraulic pressures greater than a particular value and wherein
the fluid from the jack is introduced to the passage at the first end of the passage and wherein
the bias provided by the biasing means is at a sufficiently low value to prevent the jack from being extended when the operation of the jack is not desired and to provide for the operation of the jack when the pressure of the fluid starts to exceed the bias provided by the biasing means.

53. A combination as set forth in claim 52, including,
means for providing for a bleeding of the fluid through the passage, during the travel of the vehicle between destinations, for pressures less than the bias provided by the biasing means.

54. In combination for use in a vehicle to level the vehicle relative to gravity,
a plurality of jacks, each attached to the recreational vehicle at a strategic position on the recreational vehicle to cooperate with the other jacks in the plurality in retaining the vehicle on a level basis relative to gravity, each of the jacks in the plurality being hydraulic and being extensible and being responsive to the introduction of fluid to become extended,
a plurality of switches each associated with an individual one of the jacks in the plurality for indicating whether the vehicle is tilted downwardly relative to gravity at the position of the associated jack,
means for providing an introduction of fluid,
means responsive to the production of pressures in the fluid from the introducing means above a first particular value for providing for the introduction of fluid to the jacks to operate the jacks in a direction to level the vehicle relative to gravity, and
means responsive to the production of fluid pressures in the jacks below the first particular value for bleeding fluid from the jacks at a relatively slow rate to prevent the jacks from becoming extended while the vehicle is travelling.

55. A combination as set forth in claim 54, including,
means responsive to a levelling of the vehicle relative to gravity to extend to the ground the jacks displaced from the ground until the production of a particular pressure of relatively low value in the fluid in such jacks.

56. A combination as set forth in claim 54, including,
a plurality of air bags on the vehicle, the air bags being filled with air during the travel of the vehicle between destinations, and
means for exhausting the air from the air bags before the jacks are extended.

57. In combination,
energizing means,
an armature actuatable by the energizing means from a first position to a second position,
means operatively coupled to the armature for biasing the armature to the first position,
a needle separated from the armature and disposed in coupled relationship to the armature,
the needle having a tapered end,
means defining a passage and defining a valve seat in the passage to define with the tapered end of the needle a valve having open and closed positions,
the armature being biased in the first position to move the needle in a direction for closing the valve and being actuatable to move the needle to the position for opening the valve, and
means for providing for the flow of fluid through the passage when the armature is actuated to the second position.

58. In a combination as set forth in claim 57,
the interior of the armature being hollow and a spacer being disposed within the hollow interior of the armature and in operatively coupled relationship with the needle and a fluid being disposed within the hollow interior of the armature.

59. In a combination as set forth in claim 58,
the valve seat being made from a soft material relative to the material of the needle and being provided with a taper and the angle of the taper of the valve seat being greater than the angle of the taper of the needle.

60. In combination,
means defining a passage,
these being a valve seat in the passage,
a needle movably disposed in the passage and shaped relative to the valve seat to define with the valve seat a valve having open and closed positions dependent upon the positioning of the needle in the passage,
an armature operatively coupled to the needle at one end of the needle for moving the needle in a direction to close the valve,
means operatively coupled to the armature for biasing the armature in a first direction to close and valve,
means for providing an electrical signal,
means responsive to the electrical signal for obtaining the movement of the armature in a second direction opposite to the first direction to open the valve,
means for providing for a flow of fluid through the passage with armature in the second position,
the interior of the armature being hollow, and
means disposed in the hollow interior of the armature for damping the movements of the armature between the first and second positions.

61. In a combination as set forth in claim 60,
the needle being tapered at the end adjacent the valve seat and the valve seat being tapered and the valve seat being made from a softer material than the needle.

62. In a combination as set forth in claim 61,
the angle of the taper of the valve seat being greater than angle of the taper of the needle.

63. In a combination as set forth in claim 60,
the damping means including a spacer and a fluid disposed in the hollow interior of the armature and the spacer being operatively coupled to the needle at the end of the needle opposite the tapered end.

* * * * *